US006860924B2

United States Patent
Rajagopalan et al.

(10) Patent No.: US 6,860,924 B2
(45) Date of Patent: Mar. 1, 2005

(54) AIR-STABLE METAL OXIDE NANOPARTICLES

(75) Inventors: Shyamala Rajagopalan, Manhattan, KS (US); Olga B. Koper, Manhattan, KS (US); Kenneth J. Klabunde, Manhattan, KS (US); Paul S. Malchesky, Painesville Township, OH (US); Slawomir Winecki, Manhattan, KS (US)

(73) Assignee: NanoScale Materials, Inc., Manhattan, KS (US)

( * ) Notice: Subject to any disclaimer, the term of this patent is extended or adjusted under 35 U.S.C. 154(b) by 0 days.

(21) Appl. No.: 10/164,901

(22) Filed: Jun. 7, 2002

(65) Prior Publication Data

US 2003/0226443 A1 Dec. 11, 2003

(51) Int. Cl.⁷ .............................................. B01D 53/02
(52) U.S. Cl. ........................................ 96/154; 428/403
(58) Field of Search ................ 96/154, 226; 210/502.1, 210/504, 506; 95/116, 128, 131, 133, 135, 141, 900; 502/150, 159, 300, 340; 588/200, 205, 206; 424/489; 428/403

(56) References Cited

U.S. PATENT DOCUMENTS

| | | | | |
|---|---|---|---|---|
| 5,833,739 A | * | 11/1998 | Klatte et al. | 95/136 |
| 5,968,366 A | * | 10/1999 | Deckman et al. | 210/651 |
| 5,968,652 A | * | 10/1999 | Hanggi et al. | 428/405 |
| 5,990,373 A | | 11/1999 | Klabunde | |
| 6,057,488 A | | 5/2000 | Koper et al. | |
| 6,087,294 A | | 7/2000 | Klabunde et al. | |
| 6,093,236 A | | 7/2000 | Klabunde et al. | |
| 6,136,373 A | * | 10/2000 | Back et al. | 427/214 |
| 6,294,498 B1 | * | 9/2001 | Darcissac et al. | 502/159 |
| 6,387,531 B1 | | 5/2002 | Bi et al. | |
| 6,417,423 B1 | | 7/2002 | Koper et al. | |
| 6,447,577 B1 | * | 9/2002 | Espin et al. | 95/136 |
| 6,653,519 B2 | | 11/2003 | Koper et al. | |
| 2002/0104801 A1 | * | 8/2002 | Voute et al. | 210/656 |
| 2003/0224056 A1 | * | 12/2003 | Kotha et al. | 424/489 |

OTHER PUBLICATIONS

Malchesky, P.S.; Varnes, W.; Piatkiowicz, W.; Nose, Y., *Trans. Am. Soc. Artif. Intern. Organs*, (1977), vol. XXIII:659.

Almquist, C.B.; Hwang, S., *Journal of Membrane Science*, (1999), 153:57–69.

Wagner, G.W.; Koper,O.B.; Lucas, E.; Decker, S.; Klabunde, K.J., *J. Phys. Chem. B*. (2000), 104:5118.

Khaleel, A.; Kapoor, P.N.; Klabunde, K.J.; *Nanostruct. Mater.*, (1999), 11:459.

Lucas, E.; Klabunde, K.J., *Nanostruct. Mater.*, (1999), 11:179.

Wagner, G. W.; Bartram, P.W.; Koper, O., Klabunde, K.J.,*J. Phys. Chem. B*. (1999), 103: 3225.

Koper, O.B.; Lagadic, I.; Volodin, A.; Klabunde, K.J., *Chem. Mater.*, (1997), 9: 2468.

Klabunde, K.J.; Stark, J.V.; Koper, O.B.; Mohs, C.; Park, D.G.; Decker, S.; Jiang, U.; Lagadic, I.; Zhang, D., *J. Phys. Chem.*, (1996), 100:12142.

Li, Y.X.; Klabunde, K.J., *Langmuir*, (1991), 7:1388.

Somasundara, P.; Fu, E.; Xu, Q., *Langmuir*, (1992), 8: 1065.

Holland, P.M., in *Phenomena in Mixed Surfactant Systems*: ACS Symposium Series 311: Scamehorn. J.F., Ed.; American Chemical Society: Washington, DC, (1986); pp. 102–115.

Xu, Z.; Liu, Q.; Finch J.A.,*Appl. Surf. Sci.*, (1997), 120:269.

Cao, C.; Fadeev, A.Y.; McCarthy, T.J., *Langmuir*..(2001), 17:757.

\* cited by examiner

Primary Examiner—Frank M. Lawrence
(74) Attorney, Agent, or Firm—Hovey Williams LLP

(57) ABSTRACT

Compositions and methods for destroying chemical and biological agents such as toxins and bacteria are provided wherein the substance to be destroyed is contacted with finely divided metal oxide nanoparticles. The metal oxide nanoparticles are coated with a material selected from the group consisting of surfactants, waxes, oils, silyls, synthetic and natural polymers, resins, and mixtures thereof. The coatings are selected for their tendency to exclude water while not excluding the target compound or adsorbates. The desired metal oxide nanoparticles can be pressed into pellets for use when a powder is not feasible. Preferred metal oxides for the methods include MgO, SrO, BaO, CaO, $TiO_2$, $ZrO_2$, FeO, $V_2O_3$, $V_2O_5$, $Mn_2O_3$, $Fe_2O_3$, NiO, CuO, $Al_2O_3$, $SiO_2$, ZnO, $Ag_2O$, the corresponding hydroxides of the foregoing, and mixtures thereof.

8 Claims, 24 Drawing Sheets

AIR-STABLE METAL OXIDE NANOPARTICLES

BACKGROUND OF THE INVENTION

1. Field of the Invention

The present invention is broadly concerned with compositions and methods for sorbing and/or destroying dangerous substances such as chemical and biological warfare agents and environmental pollutants in air, water, and soil. The methods of the invention are carried out by simply contacting the target substance with metal oxide nanoparticles coated with a coating material selected from the group consisting of oils, surfactants, waxes, silyls, polymers (both synthetic and natural), epoxy resins, and mixtures thereof.

2. Description of the Prior Art

The extremely high surface reactivity of a variety of nanocrystalline inorganic oxides has been well documented (see e.g., U.S. Pat. Nos. 6,093,236, 6,057,488, 5,990,373, each incorporated by reference herein). These patents demonstrate their use as destructive absorbents for various toxic materials, including acid gases, air pollutants, and chemical and biological warfare agents. While there can be no doubt about the emerging popularity of nanoparticles as superadsorbents, one significant drawback for some is their sensitivity to air exposure that results in appreciable reactivity loss. For example, magnesium oxide nanoparticles typically undergo the following changes upon exposure to humid air (50–55% RH, room temperature, 24 hours):

- weight gain of 45–60%;
- large decrease in surface area (from 500–600 $m^2/g$ to 40–50 $m^2/g$);
- change in pore structure
  - pore diameter (from 35–91 Å to 107–319 Å);
  - pore volume (0.5–0.9 cc/g to 0.2–0.3 cc/g);
- partial conversion to hydroxide as demonstrated by IR and XRD analyses (see FIGS. 1 and 2);
- some carbonate formation as illustrated by IR analysis (see FIG. 1);
- reduced reactivity towards paraoxon (see FIG. 3);
  - nanocrystalline magnesium oxide (0.2 g) adsorbs 9 μL of paraoxon in about 3 minutes;
  - humidified nanocrystalline magnesium oxide particles adsorb only 40–50% of this amount even after 20 hours.

Thus, there is a need for improved nanocrystalline metal oxide adsorbents which do not lose their adsorbent properties upon exposure to air. Furthermore, these adsorbents should have a coating material which tends to exclude air (water, carbon dioxide, etc.) while allowing the target compound to contact and penetrate the coating so that the target compound will contact the reactive nanoparticle metal oxide.

SUMMARY OF THE INVENTION

The present invention overcomes these problems and provides compositions and methods for destructively sorbing (e.g., adsorption, absorption, and chemisorption) and destroying biological and chemical agents. This is broadly accomplished through use of finely divided nanoscale metal oxide adsorbents which are at least partially coated with a coating material.

In more detail, the nanoscale adsorbents according to the invention are formed from metal oxides. Preferred metal oxides include those selected from the group consisting of MgO, SrO, BaO, CaO, $TiO_2$, $ZrO_2$, FeO, $V_2O_3$, $V_2O_5$, $Mn_2O_3$, $Fe_2O_3$, NiO, CuO, $Al_2O_3$, $SiO_2$, ZnO, $Ag_2O$, the corresponding hydroxides of the foregoing, and mixtures thereof. While conventionally prepared powders can be used in the methods of the invention, the preferred powders are prepared by aerogel techniques from Utamapanya et al., Chem. Mater., 3:175–181 (1991), incorporated by reference herein. The adsorbents prior to coating should have an average crystallite size (as is conventional in the art, the term "particle" is used herein interchangeably with the term "crystallite.") of up to about 20 nm, preferably from about 2–10 nm, and more preferably 4 nm, and exhibit a Brunauer-Emmett-Teller (BET) multi-point surface area of at least about 15 $m^2/g$, preferably at least about 80 $m^2/g$, and more preferably from about 200–850 $m^2/g$. In terms of pore radius, the preferred adsorbents should have an average pore diameter of at least about 20 Å, more preferably from about 30–100 Å, and most preferably from about 50–90 Å.

As mentioned above, the metal oxide particles are at least partially coated with a quantity of a coating material other than metal oxide coatings. As used herein, "coated" or "coating" is intended to refer to coatings which only physically coat the particles, as well as those coatings which modify or react with the metal oxide surfaces. Preferred coating materials include those selected from the group consisting of surfactants, oils, polymers (both synthetic and natural; e.g., silicone rubber and cellulose and its derivatives), resins, waxes, silyls, and mixtures thereof. The surfactant can be cationic, anionic, and/or nonionic, with preferred surfactants being those selected from the group consisting of N,N-dimethyl dodecyl amine, dioctyl sodium sulfosuccinate, 2,4,7,9-tetramethyl-5-decyne-4,7-diol, nonylphenol polyethylene glycol ethers, $C_{10-14}$ alkyl ether phosphates, ethoxylated alcohols, propoxylated alcohols, alkyl amines, amine salts, ethoxylated amines, modified linear aliphatic polymers, and mixtures thereof.

Preferred oil coatings are mineral oils, silicone oils, fomblin oils, and vegetable oils, with mineral oils being particularly preferred. Furthermore, while any available wax is suitable as a coating in the inventive composition, preferred waxes are paraffin wax, carnauba wax, and polyethylene waxes. The nanoparticles can also be derivatized using silyl reagents. In this embodiment, the silyl will typically chemically modify the nanoparticle surface. Preferred silyl reagents have the general formula $R_nSi(R')_{4-n}$, where R is a $C_1$–$C_{20}$ hydrocarbyl or functionalized hydrocarbyl group, R' is a hydrolysable group such as a $C_1$–$C_3$ alkoxy, a halide, an amino, or a carboxylate group, and n is 1, 2, or 3. Dimers and oligomers of this formula are also suitable. A particularly preferred silyl reagent is n-octyl trimethoxysilane.

The methods by which the inventive nanoparticles are formed depend upon the particular coating material utilized. In embodiments where the coating material is a surfactant, the compositions are formed by mixing the particular metal oxide nanoparticles and the desired surfactant(s) in the presence of a non-aqueous and aqueous solvent (e.g., hexane) for a time period of from about 2–24 hours. After mixing, the composition is preferably centrifuged and then dried at a temperature of from about 100–110° C. for a time period of from about 1–2 hours. Alternately, the materials can be prepared by a dry mixing process.

The quantities of the metal oxide nanoparticles and surfactants used should be such that the final metal oxide nanoparticle comprises at least about 2% by weight surfactant, more preferably from about 5–50% by weight surfactant, and most preferably from about 10–50% by weight surfactant, based upon the weight of the metal oxide nanoparticles taken as 100% by weight.

In embodiments where the nanoparticles are coated with oil, the composition is made by simply mixing the dry metal oxide particles with the particular oil. The respective quantities of metal oxide particles and oil should be selected so that the final composition comprises at least about 10% by weight oil, preferably from about 25–140% by weight oil, and more preferably 50–100% by weight oil, based upon the weight of the metal oxide nanoparticles taken as 100% by weight.

In embodiments where the nanoparticles are coated with a wax, the compositions are prepared by mixing the nanoparticles with the particular wax in the presence of heat (e.g., by mixing in a hot oil bath at temperatures of at least about 10° C. above the melting point of the particular wax or waxes). In this embodiment, the final composition should comprise at least about 10% by weight wax, preferably from about 25–100% by weight wax, and more preferably 50–75% by weight wax, based upon the weight of the metal oxide nanoparticles taken as 100% by weight.

In the embodiment where the metal oxides surfaces are modified with a silyl coupling agent, a solution is preferably prepared which includes the silyl, a small amount of acid (e.g., 4–8 drops of acetic acid), and an alcohol solution (e.g., ethanol, 95% aq.). The reaction mixture is stirred for about 3–7 minutes in order to allow hydrolysis and silanol formation. Then, the desired metal oxide nanoparticles are added to the solution followed by stirring for 10–20 minutes. The composition is preferably then centrifuged, washed with ethanol, dried at about 100–110° C. for about 25–35 minutes and kept in a desiccator under vacuum overnight. In this embodiment, the amount of silyl should be such that the final composition comprises at least about 2% by weight of the silyl compound, preferably from about 5–100% by weight of the silyl compound, and more preferably 25–50% by weight of the silyl compound, based upon the weight of the metal oxide nanoparticles taken as 100% by weight.

In the embodiment where the nanoparticles are incorporated into polymers or resins, the composites can be prepared by mixing the nanoparticles with either the polymer or resin precursors or the polymers and resins themselves. Both natural and synthetic polymers may be used in making the composites. Natural polymers include proteins, DNA, RNA, enzymes, carbohydrates and starches. Synthetic polymers include butadiene, styrene, copolymers of butadiene and sytrene, copolymers of styrene, acrylonitrile and methylmethacrylate, polyethyl acrylate, polyvinylchloride, polybutadiene-coacrylonitrile, acrylonitrile-butadiene-styrene, other copolymers, and simple polymers including cellulosics, silicon rubbers, polyolefins (such as polyethylene and polypropylene), nylons, rubbers, polyurethane, polyimides, rayon, polymethyl methacrylate, polyvinylidene chloride, polycarbonates, aramids, polyvinylpyrrolidone and polyesters. The precursors, polymers, or resins can be in the melt or liquid forms (either cast-formed or spin-formed), films, fibers, hollow fibers and other forms. As an example, silicone membranes containing nanoparticles can be prepared. Silicone rubber/elastomer is a particularly relevant material because it is highly permeable to particular chemical and biological agents as shown in Almquist et al., Journal of Membrane Science, 153 (1999) 57–69, incorporated by reference herein. Incorporating the nanoparticles into the silicone rubber/elastomer material permits a wide range of application means such as spraying, dipping, casting, extrusion, molding and other forming means.

Regardless of the embodiment, the coating process will result in a composite having an average overall crystallite size of up to about 25 nm, more preferably from about 2–20 nm, and most preferably from about 4–8 nm.

In another embodiment, the above-described coated nanoparticles can be formed into pellets for use when powder decontaminants are not feasible. These pellets are formed by pressing a quantity of one of these powdered (and coated) metal oxide composites at a pressure of from about 50–6,000 psi, more preferably from about 500–5,000 psi, and most preferably at about 2,000 psi. While pressures are typically applied to the powder by way of an automatic or hydraulic press, one skilled in the art will appreciate that the pellets can be formed by any pressure-applying means, including extrusion. Furthermore, a binder or filler can be mixed with the adsorbent powder, and the pellets can be formed by pressing the mixture by hand. Agglomerating or agglomerated as used hereinafter includes pressing together of the adsorbent powder as well as pressed-together adsorbent powder. Agglomerating also includes the spraying or pressing of the adsorbent powder (either alone or in a mixture) around a core material other than the adsorbent powder. Furthermore, another embodiment is the incorporation of the nanoparticles into films, fibers or coatings as shown in Malchesky et al., Trans. Am. Soc. Artif. Intern. Organs, Vol. XXIII (1977) 659–665, incorporated by reference herein.

In order to effectively carry out the methods of the invention, the pellets should retain at least about 25% of the multi-point surface area/unit mass of the coated metal oxide particles prior to pressing together thereof. More preferably, the multi-point surface area/unit mass of the pellets will be at least about 50%, and most preferably at least about 90% of the multi-point surface area/unit mass of the starting metal oxide particles prior to pressing. The pellets should retain at least about 25% of the total pore volume of the coated metal oxide particles prior to pressing thereof, more preferably, at least about 50%, and most preferably at least about 90% thereof. In the most preferred forms, the pellets will retain the above percentages of both the multi-point surface area/unit mass and the total pore volume. The pellets normally have a density of from about 0.2 to about 2.0 g/cm$^3$, more preferably from about 0.3 to about 1.0 g/cm$^3$, and most preferably from about 0.4 to about 0.7 g/cm$^3$. The minimum surface-to-surface dimension of the pellets (e.g., diameter in the case of spherical or elongated pellet bodies) is at least about 1 mm, more preferably from about 10–20 mm.

In carrying out the methods of the invention, one or more of the above described metal oxide particle composites is contacted with the target substance to be sorbed, decontaminated or destroyed under conditions for sorbing, decontaminating or destroying at least a portion of the substance. The methods of the invention provide for destructively adsorbing a wide variety of chemical agents, including agents selected from the group consisting of acids, alcohols, compounds having an atom of P, S, N, Se, or Te, hydrocarbon compounds, and toxic metal compounds. The methods of the invention also provide for biocidally adsorbing a wide variety of biological agents, including spores, bacteria, fungi, viruses, rickettsiae, chlamydia, and toxins. Utilizing the metal oxide particulate composites in accordance with the methods of the invention is particularly useful for biocidally adsorbing biological agents such as spore-forming bacteria, especially gram positive bacteria like *B. globigii* and *B. cereus*. In another embodiment, the methods of the invention provide for the destructive adsorption of hydrocarbon compounds, both chlorinated and non-chlorinated.

The contacting step can take place over a wide range of temperatures and pressures. For example, the particulate metal oxide composites can be taken directly to a contaminated site and contacted with the contaminant and/or contaminated surfaces at ambient temperatures and pressures. Alternately, the contacting step can be carried out at a temperature of from about −70–700° C. If the contacting step is to be carried out under ambient temperatures, preferably the reaction temperature range is from about 15–50° C. If the contacting step is to be carried out under high temperature conditions, then preferably the temperature range for the reaction is from about 300–500° C.

If the contacting step is carried out under ambient conditions, the particulate metal oxide composites should be allowed to contact the target substance for at least about 2 minutes, preferably from about 60–1440 minutes, and more preferably from about 60–120 minutes. If the contacting step is carried out under high temperatures conditions, then the particulate metal oxide composites should be allowed to contact the target substance for at least about 2 seconds, preferably for about 5–20 seconds, and more preferably for about 8–10 seconds.

If the target substance is a biological agent, the contacting step results in at least about a 90% reduction in the viable units of the biological agent, preferably at least about a 95% reduction, and more preferably at least about a 99% reduction. If the target substance is a chemical agent, the contacting step results in at least about 50% reduction in the concentration of the chemical agent, preferably at least about a 75% reduction, and more preferably at least about a 90% reduction.

Those skilled in the art will appreciate the benefits provided by the methods of the invention. In accordance with the invention, military personnel can utilize the particulate metal oxides and composites thereof to neutralize highly toxic substances such as nerve agents and biological agents. These particles and composites can be utilized in their non-toxic ultrafine powder form to decontaminate areas exposed to these agents, or the highly pelletized composites can be utilized in air purification or water filtration devices. Other countermeasure and protective uses for the metal oxide particles and composites of the particles include personnel ventilation systems and wide-area surface decontamination. Furthermore, the metal oxide composites may remain airborne, thus providing effective airborne decontamination of chemical or biological agents. Alternately, the composites can be formulated into a cream or other skin applicators or incorporated into or on clothing in order to provide protection to personnel at risk of contacting a dangerous agent.

Unlike currently available decontamination methods, the methods of the invention utilize composites that are non-toxic to humans and non-corrosive to equipment, thus permitting the decontaminated equipment to be put back into use rather than discarded. Furthermore, because the composites are easy to disperse and readily transportable, and because little or no water or additive is required to practice the invention, it is relatively simple to destroy the contaminants at the contaminated site.

DETAILED DESCRIPTION OF THE PREFERRED EMBODIMENTS

EXAMPLES

Figure 1:
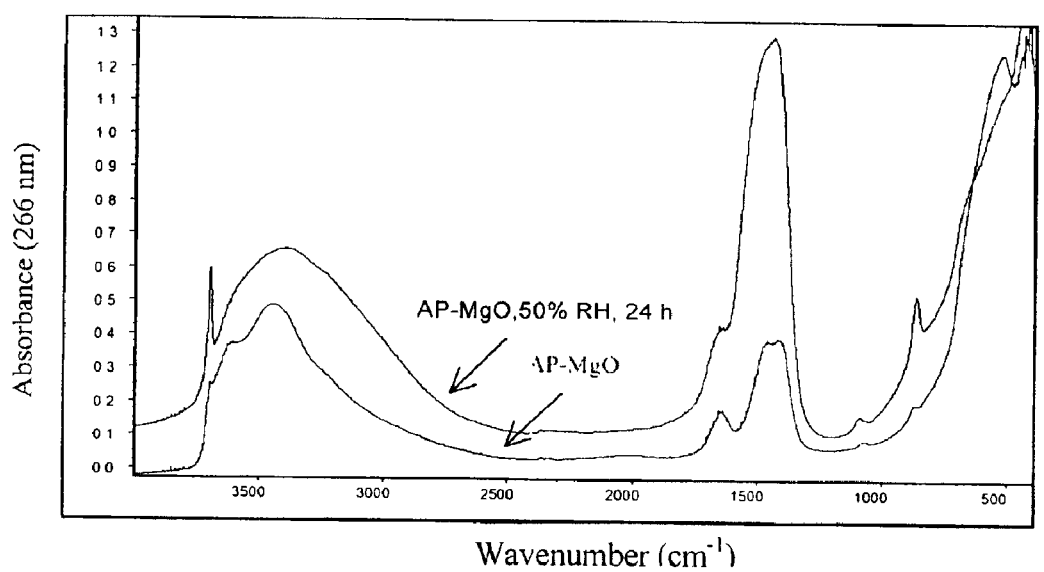
FIG. 1 is a graph depicting an IR spectrum of magnesium oxide nanoparticles before and after humidity exposure.
Figure 2:
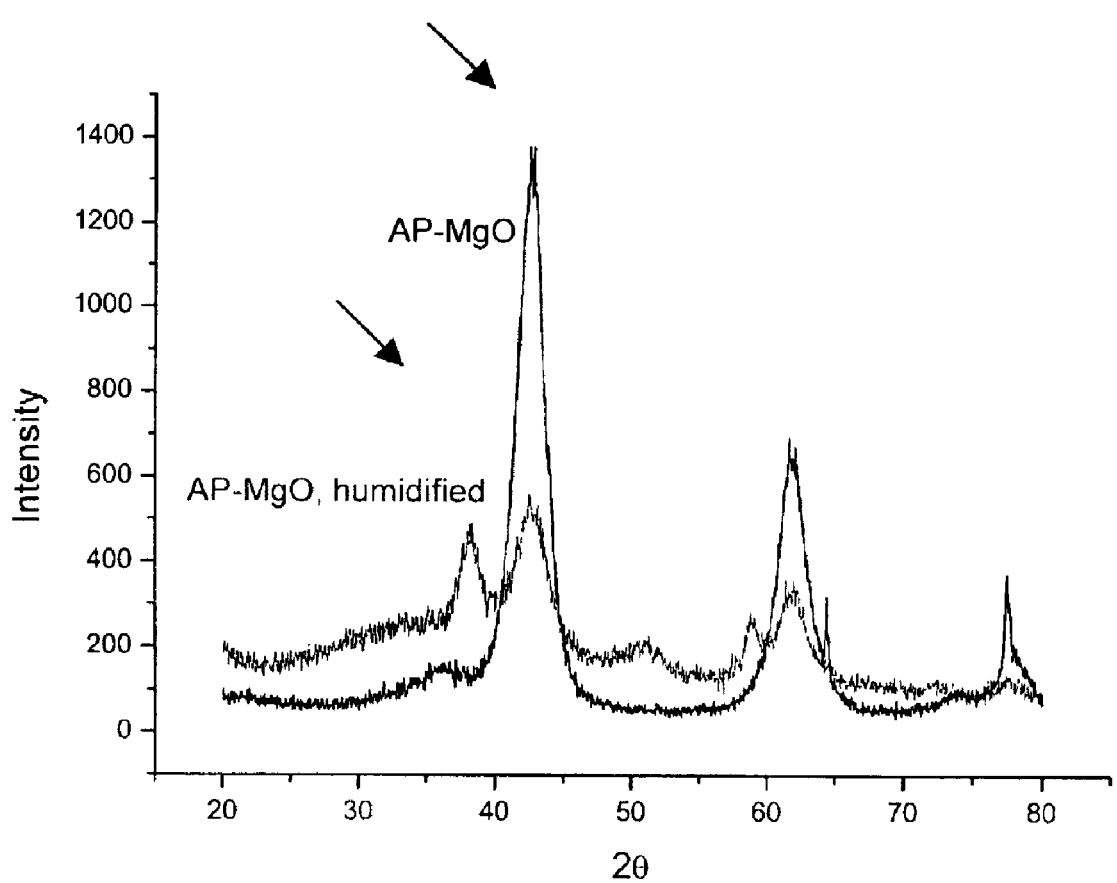
FIG. 2 shows the XRD of magnesium oxide nanoparticles before and after humidity exposure.
Figure 3:
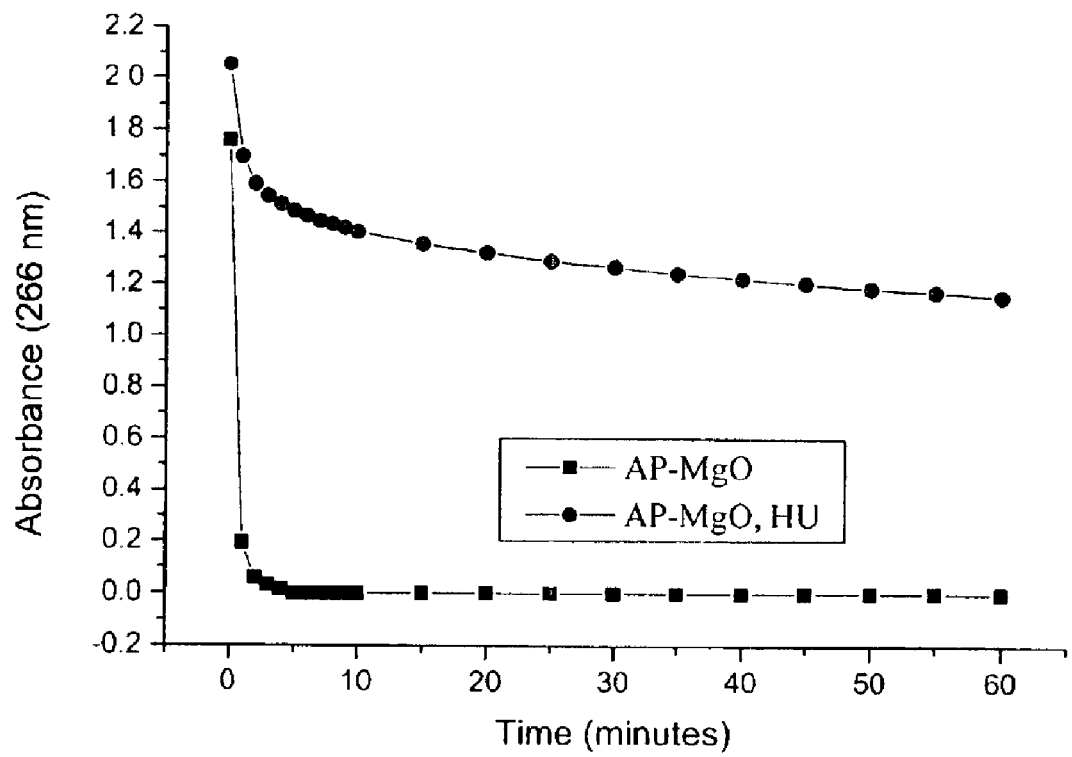
FIG. 3 is a graph demonstrating the rate of adsorption of paraoxon by magnesium oxide nanoparticles before and after humidity exposure.

The following examples set forth preferred methods in accordance with the invention. It is to be understood, however, that these examples are provided by way of illustration and nothing therein should be taken as a limitation upon the overall scope of the invention.

General Procedures
1. Humidification of Samples

In each of the following examples, when a sample was subjected to humidity, this was accomplished by placing the particular sample in a humidity chamber for 24 hours at 50–55% relative humidity. The percent weight gain was calculated, and the humidified sample was analyzed by XRD and BET multi-point surface area analyses as described below.

Example 1

Magnesium Oxide Nanoparticles Coated with a Surfactant

1. Preparation of Materials

Several 1 g samples of magnesium oxide nanoparticles were individually coated with from 1–20% by weight of a hydrocarbon-based surfactant. This was accomplished by adding the magnesium oxide nanoparticles and the desired surfactant to a 250 mL, stoppered Erlenmeyer flask equipped with a stir bar and containing 50 mL of hexanes. The reaction mixture was stirred for 20 hours followed by centrifuging and drying in an oven 110° C. for one hour. The resulting samples were characterized by BET and XRD. The BET multi-point surface area was determined using $N_2$ adsorption at liquid $N_2$ temperature to measure the surface area/unit mass. The BET surface area measurement techniques are described in *Introduction to Powder Surface Area*, Lowell, S., John Wiley & Sons: New York (1979), incorporated by reference herein. Table 1 sets forth the results of this analysis, along with the particular surfactants that were used.

TABLE 1

| | | | XRD | | SSA, $m^2/g$ | |
| --- | --- | --- | --- | --- | --- | --- |
| Entry | Surfactant | Wt. % | before humidity | after humidity | before humidity | after humidity |
| 1 | None | 0 | oxide | oxide + hydroxide | 586 | 29.8 |
| 2 | DDA (N,N-Dimethyl dodecyl amine)[a]- Cationic surfactant | 1 | oxide | oxide + hydroxide | 477 | 31.3 |
| 3 | | 3 | oxide | oxide + hydroxide | 475 | 34.6 |
| 4 | | 5 | oxide | oxide + hydroxide | 426 | 24.6 |
| 5 | | 10 | oxide | oxide + hydroxide | 399 | 33.8 |
| 6 | | 20 | oxide | oxide + hydroxide | 361 | 34.5 |
| 7 | AOT (Aerosol- OT)[b]-Anionic surfactant | 2 | oxide | oxide + hydroxide | 444 | 41.6 |
| 8 | | 5 | oxide | oxide | 415 | 47.1 |

TABLE 1-continued

| Entry | Surfactant | Wt. % | XRD before humidity | XRD after humidity | SSA, m²/g before humidity | SSA, m²/g after humidity |
|---|---|---|---|---|---|---|
| 9 |  | 10 | oxide | oxide | 426 | 64.1 |
| 10 |  | 20 | oxide | oxide | 378 | 71.3 |

[a]N,N-dimethyldodecylamine $(CH_3(CH_2)_{11}N(CH_3)_2)$, obtained from Aldrich.
[b]dioctyl sodium sulfoccinate $(CH_3(CH_2)_3CH(Et)CH_2OC(O)CH_2CH(SO_3Na)C(O)OCH_2CH(Et)(CH_2)_3CH_3)$, obtained from Fisher.

These results show that the respective surface areas of the surfactant-treated magnesium oxide nanoparticles before humidification were generally less than those of the uncoated samples. Furthermore, the decreases in surface area in the BET data of all surfactant-treated magnesium oxide samples after humidity exposure were the same as the uncoated samples with the values after humidification being higher than the untreated humidified sample.

Table 2 summarizes the weight gain observed by various surfactant-coated magnesium oxide nanoparticles. This further suggests that there is some degree of protection offered by these surfactant coatings as demonstrated by the reduction in weight gain under humidifying conditions.

TABLE 2

| Entry | Surfactant Name | Surfactant Type | Weight Gain Upon Humidity Exposure % |
|---|---|---|---|
| 1 | none | N/A | 51 |
| 2 | Triton X-114[a] | neutral | 34 |
| 3 | Surfynol 104A[b] | neutral | 35 |
| 4 | Tergitol NP-4[c] | neutral | 34 |
| 5 | DeZOLINE T[d] | cationic | 33 |
| 6 | DDA[e] | cationic | 41 |
| 7 | Aerosol OT[f] | anionic | 30 |
| 8 | Emphos PS-236[g] | anionic | 36 |

Figure 4:
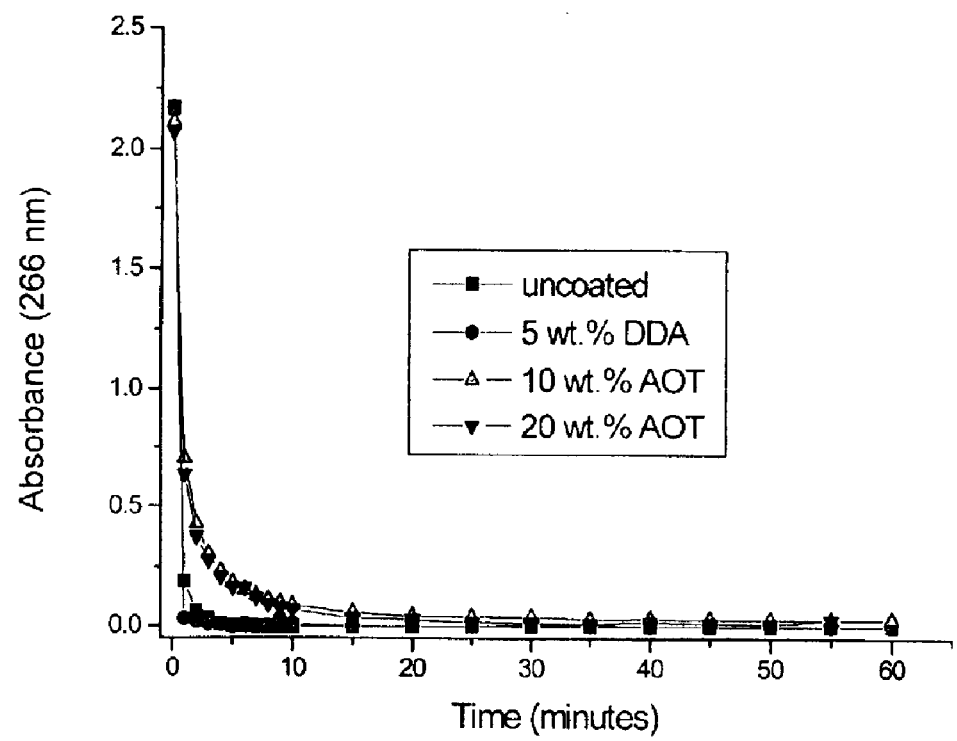
FIG. 4 demonstrates the rate of adsorption of paraoxon by magnesium oxide nanoparticles and surfactant-coated magnesium oxide nanoparticles before humidity exposure.
Figure 4:
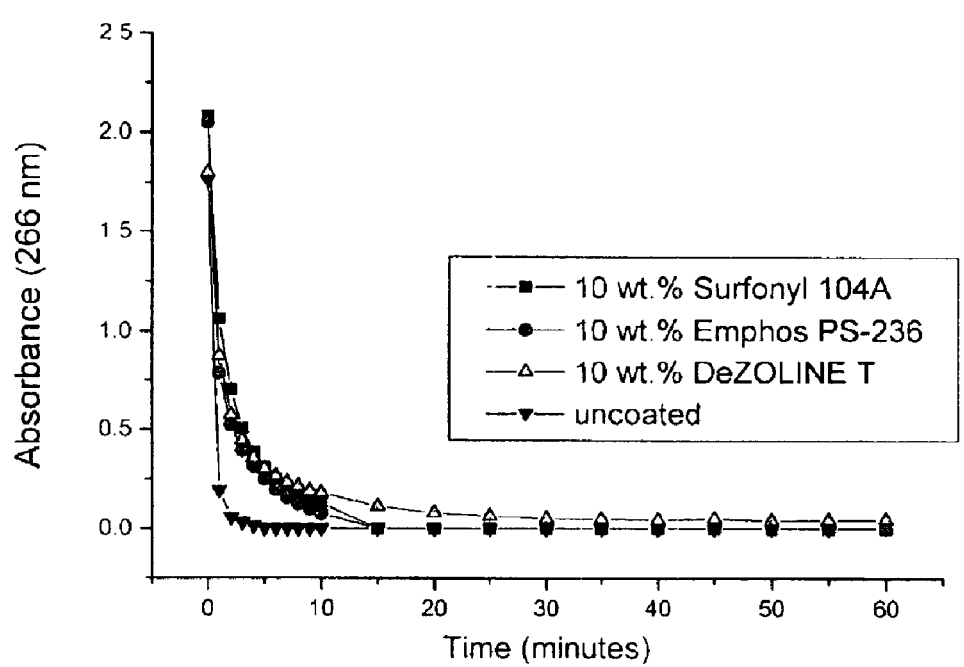
Figure 5:
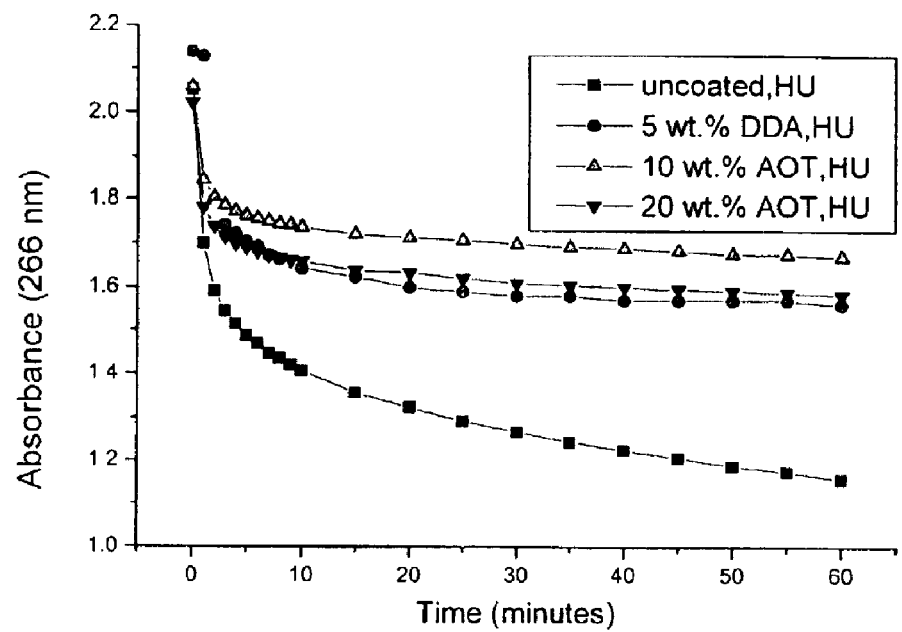
FIG. 5 shows two graphs depicting the rate of adsorption of paraoxon by magnesium oxide nanoparticles and surfactant-coated magnesium oxide nanoparticles after humidity exposure.
Figure 5:
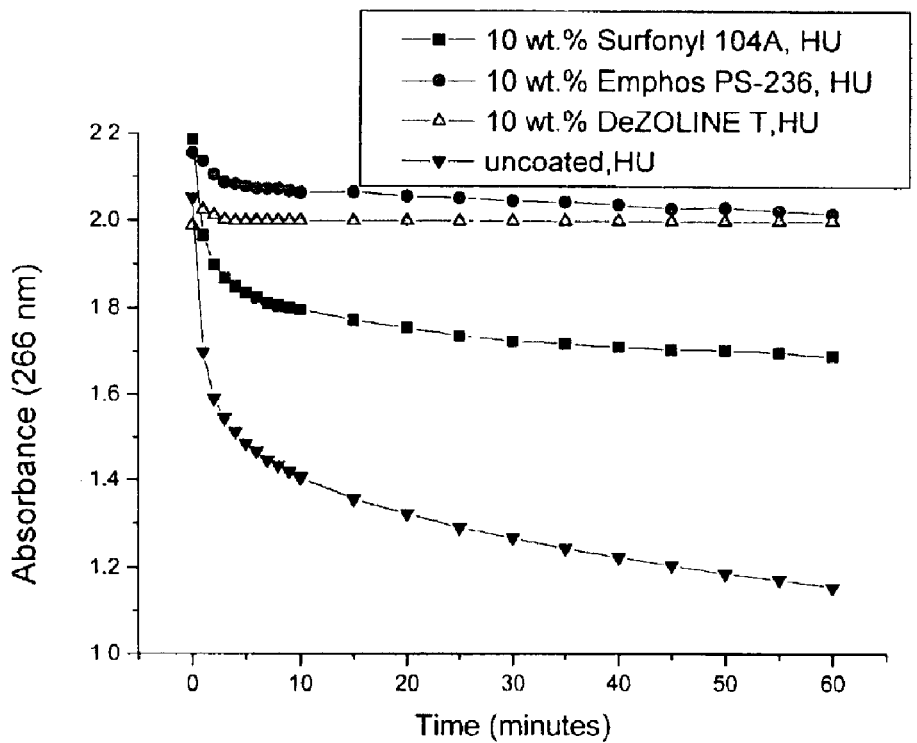

[a]polyoxyethylene(8)isooctylphenyl ether, obtained from Aldrich.
[b]50% by weight 2,4,7,9-tetramethyl-5-decyne-4,7-diol in 2-ethylhexanol, obtained from Air Products.
[c]nonylphenol polyethylene glycol ether $(C_{23}H_{40}O_5)$, obtained from Union Carbide.
[d]tall oil hydroxyethyl imidazoline, obtained from DeForest.
[e]N,N-dimethyldodecylamine $(CH_3(CH_2)_{11}N(CH_3)_2)$, obtained from Aldrich.
[f]dioctyl sodium sulfoccinate $(CH_3(CH_2)_3CH(Et)CH_2OC(O)CH_2CH(SO_3Na)C(O)OCH_2CH(Et)(CH_2)_3CH_3)$, obtained from Fisher.
[g]alkyl $(C_{10-14})$ ether phosphate, obtained from Witco 2. Paraoxon Adsorption Test The surfactant-treated nanoparticles were tested for their ability to destructively adsorb paraoxon. In this procedure, 9 μL of paraoxon was added to a flask containing 200 mL of pentane followed by 0.2 g of the sample. The disappearance of the paraoxon was monitored using UV/V is spectroscopy by taking scans for 60 minutes in 1 and 5 minute increments. The disappearance of paraoxon was plotted as a function of time. Paraoxon exhibits a distinct band around 265–270 nm, and a higher adsorbance reflected larger amounts of free, unadsorbed paraoxon. The surfactant-treated magnesium oxide nanoparticles showed high chemical reactivity with paraoxon (see FIG. 4). Thus, surfactant-treated magnesium oxide nanoparticles behaved very similar to the uncoated samples. However, the surfactant-coated, humidified samples where less reactive with paraoxon than uncoated, humidified magnesium oxide samples (see FIG. 5). Thus, the conclusion drawn was that the use of a surfactant coating did provide an advantage in that it reduced weight gain upon humidity exposure, but increased reactivity was not seen in these samples when allowed a paraoxon contact time of 1 hour.

In light of this data, further testing was carried out by preparing dry mixtures of magnesium oxide nanoparticles and surfactants using a solventless procedure. These samples were then tested for weight gain and paraoxon reactivity. These results showed that the surfactant Surfynol 104-A in weight ranges of 10–100 wt. % resulted in a 40–90% reduction in weight gain under standard humidifying conditions. Also, magnesium oxide nanoparticles containing 50 wt. % of this surfactant adsorbed paraoxon completely in about 20 hours.

Example 2

Magnesium Oxide Nanoparticles with Double Surfactant Coating

1. Materials and Methods

This procedure was carried out to determine whether the use of a double surfactant coating would improve on the results obtained in Example 1 above. In this procedure, 1 g of magnesium oxide nanoparticles and the desired surfactant were added to a 250 mL, stoppered Erlenmeyer flask equipped with a stir bar and containing 50 mL of hexanes. The mixture was stirred for 20–24 hours after which a second surfactant was added followed by further stirring for another 20–24 hours. The reaction mixture was then centrifuged and dried in an oven at 110° C. for 1 hour. BET multi-point surface area and XRD measurements were taken of the resulting samples. These results are shown in Table 3.

TABLE 3

| Entry | Surfactant | Weight gain upon humidity exposure % | SSA, m²/g before humidity | SSA, m²/g after humidity | XRD pattern before humidity | XRD pattern after humidity |
|---|---|---|---|---|---|---|
| 1 | AOT/DeZOLINE T | nd[a] | 323 | 60.0 | oxide | oxide |
| 2 | AOT/Surfynol 104A | 26 | 330 | 80.9 | oxide | oxide |
| 3 | DeZOLINE T/AOT | nd | 308 | 60.7 | oxide | oxide |
| 4 | DeZOLINE T/Surfynol 104A | 29 | 312 | 46.7 | oxide | oxide |
| 5 | Surfynol 104A/AOT | 25 | 347 | 101 | oxide | oxide |
| 6 | Surfynol 104A/DeZOLINE T | nd | 288 | 86.8 | oxide | oxide |

[a]No data available.

Figure 6:
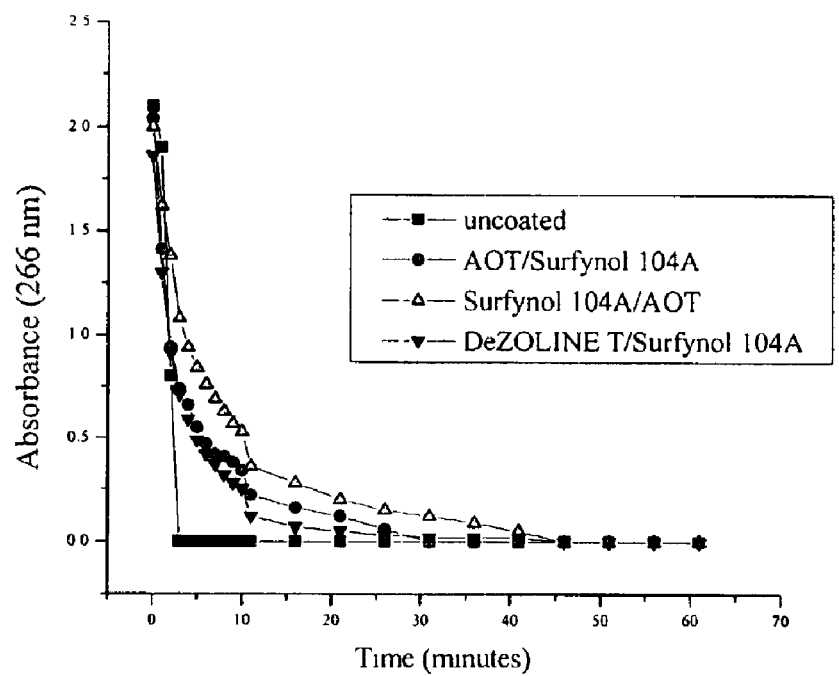
FIG. 6 depicts the rate of adsorption of paraoxon by magnesium oxide nanoparticles and double surfactant-coated magnesium oxide nanoparticles before and after humidity exposure.
Figure 6:
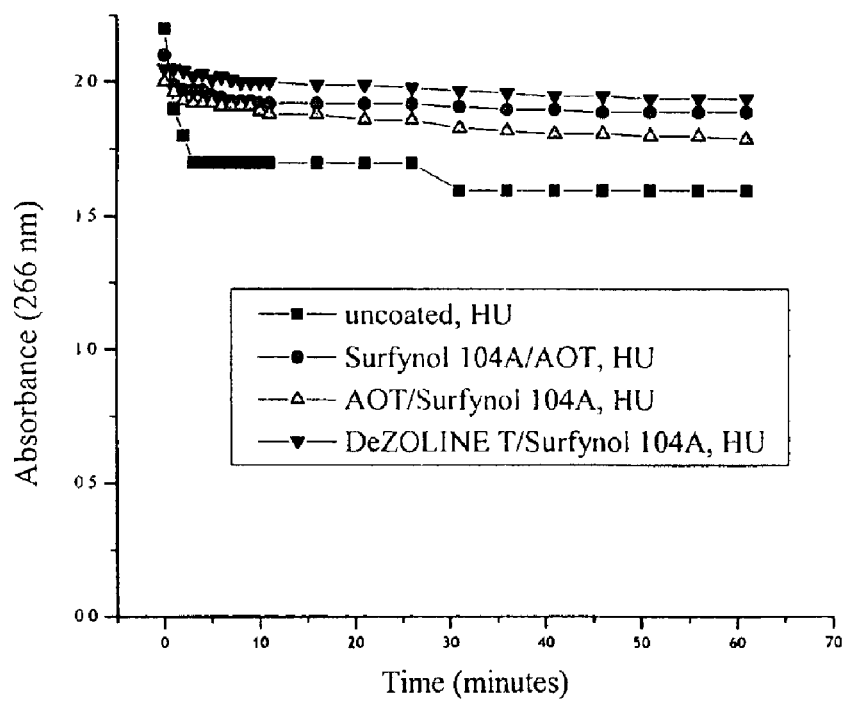

These results show that the use of a second surfactant resulted in a modest improvement in weight gain upon humidity exposure. Subsequent testing showed that the nanoparticles prepared in this example exhibited essentially the same paraoxon adsorption as the single surfactant coated samples of Example 1 (see FIG. 6).

Example 3

Magnesium Oxide Nanoparticles Coated with Oil
1. Materials and Methods

In this procedure, respective samples of dry magnesium oxide particles (3.0 g) were mixed with 50% by weight of vegetable oil or mineral oil by mixing in a plastic cylindrical container. Mixing was carried out with a Dispermat mixer (about 600 rpm for about 1 minute, mixing with a spatula, then about 800 rpm for about 1 minute). The samples were then exposed to humidifying conditions following the procedure described above. The humidified samples were analyzed for weight gain as well as paraoxon reactivity (see Table 4).

Figure 7:
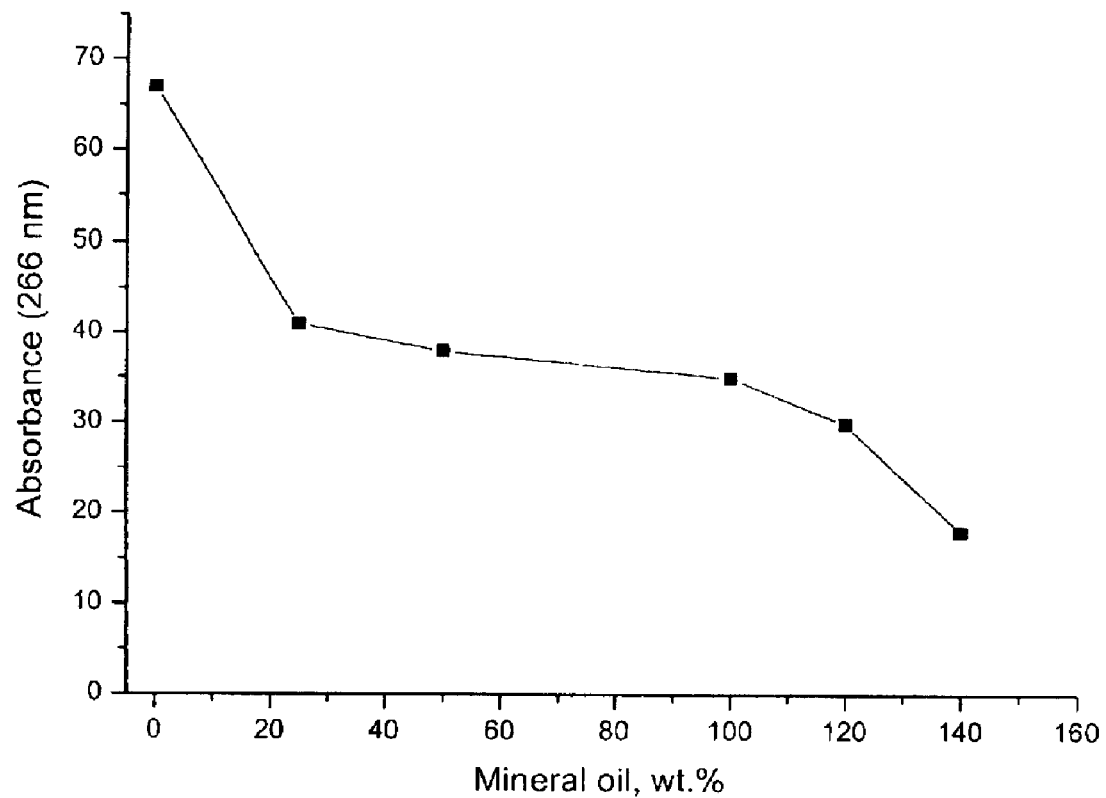
FIG. 7 is a graph showing the weight gain, after humidity exposure, by magnesium oxide nanoparticles coated with mineral oil.
Figure 8:
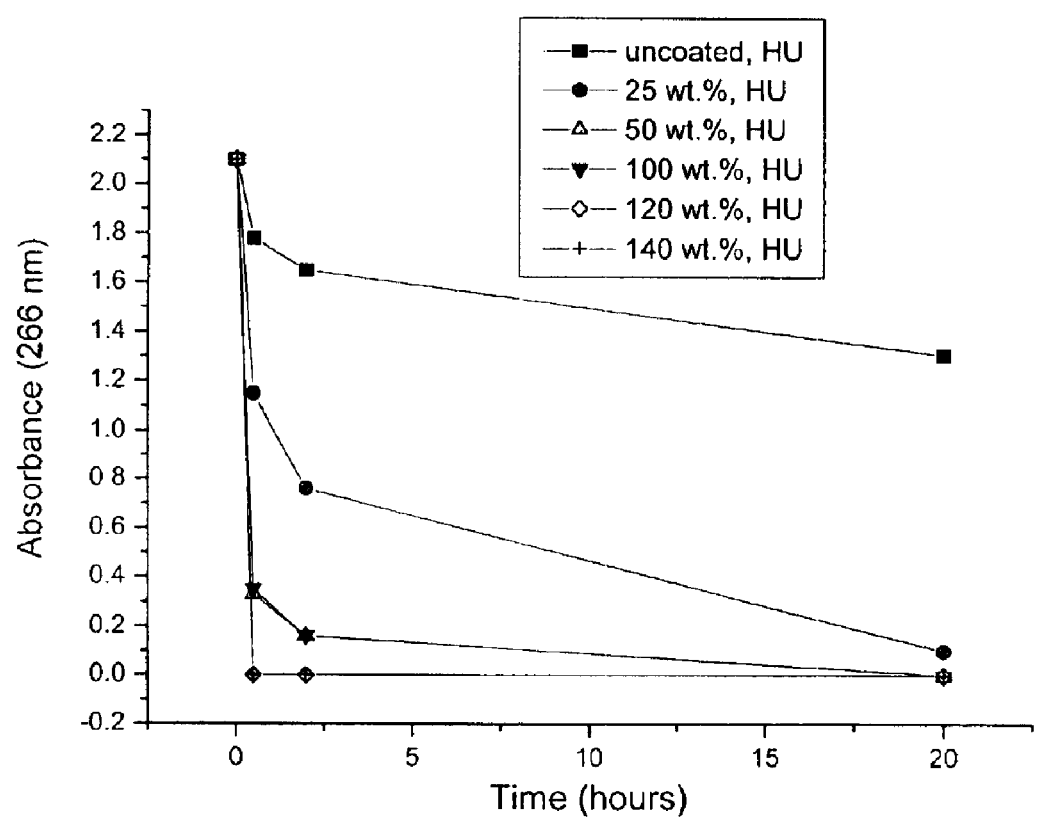
FIG. 8 shows the rate of adsorption of paraoxon by various mineral oil-coated magnesium oxide nanoparticles after humidity exposure.

Magnesium oxide nanoparticles were coated with mineral oil as described in Part 1 of this example, but by varying the quantity of mineral oil to achieve mineral oil percentages by weight of 25%, 50%, 100%, 120%, and 140%, with the weight of nanoparticles being taken as 100% by weight. The samples were then tested for air stability and paraoxon reactivity, with these results being shown in FIGS. 7 and 8. These results show that increasing the amounts of oil resulted in a smaller weight gain when exposed to humidifying conditions. Also, the mineral oil-coated samples (after humidity exposure) were found to be as reactive with paraoxon as the uncoated samples were before humidity exposure. Finally, all of the oil-coated samples were found to be more reactive than the uncoated, humidified sample (see FIG. 8).

Figure 9:
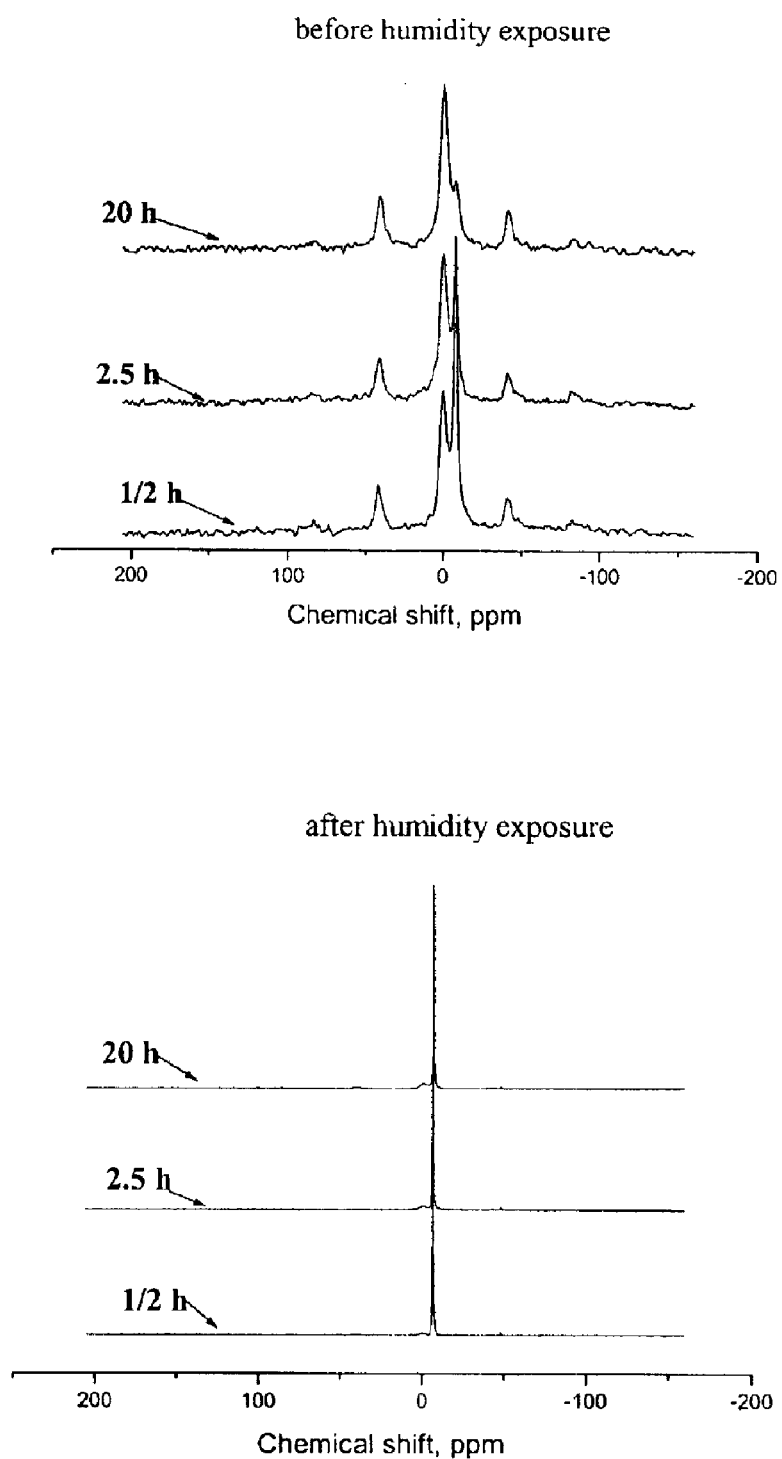
FIG. 9 shows two graphs depicting $^{31}$P NMR spectra of a magnesium oxide nanoparticles/paraoxon mixture both before and after humidity exposure.
Figure 10:
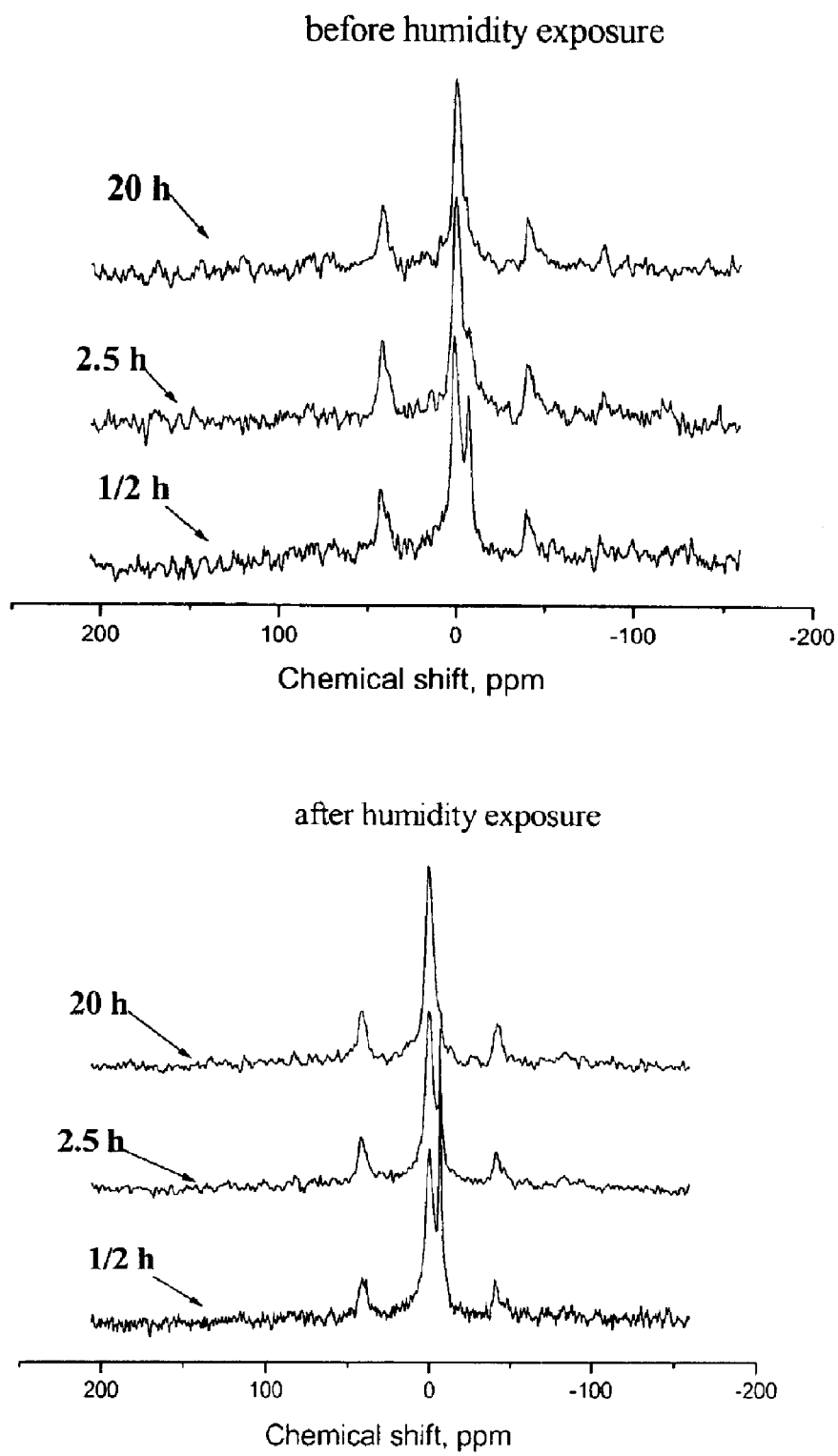
FIG. 10 depicts two $^{31}$P NMR spectra of a mixture of magnesium oxide nanoparticles coated with 50% by weight mineral oil and paraoxon, both before and after humidity exposure.

FIGS. 9 and 10 illustrate $^{31}$P NMR analyses of samples of both uncoated and coated magnesium oxide nanoparticles/paraoxon mixtures before and after humidity exposure. Paraoxon in deutero chloroform solvent exhibits a signal around δ-6.5 ppm, and the product derived via complete hydrolysis of paraoxon, the phosphate ion ($PO_4^{3-}$), shows a

TABLE 4

| Entry | Additive | Weight gain upon humidity exposure % | Humidity exposure | UV absorption reading 0.5 h | UV absorption reading 2 h | UV absorption reading 20 h |
|---|---|---|---|---|---|---|
| 1 | None | 67 | No | 0 | 0 | 0 |
|   |   |   | Yes | 1.78 | 1.65 | 1.31 |
| 2 | Mineral Oil | 38 | No | 0 | 0 | 0 |
|   |   |   | Yes | 0.33 | 0.16 | 0 |
| 3 | Vegetable Oil | 26 | No | 1.72 | 1.50 | 0.63 |
|   |   |   | Yes | 1.96 | 1.97 | 1.45 |

Both the vegetable oil and mineral oil resulted in an appreciable reduction in weight gain upon humidity exposure. While the vegetable oil-coated samples reacted poorly with paraoxon both before and after humidity exposure, the mineral oil-coated samples reacted with paraoxon similar to uncoated samples prior to humidity exposure. Furthermore, the mineral oil-coated samples reacted much faster than the uncoated or the vegetable oil-coated samples after humidity exposure.

2. Varied Amounts of Mineral Oil Coating on Magnesium Oxide Nanoparticles

This procedure was carried out to determine how the amount of mineral oil affected the properties of the samples.

signal around 0 ppm. Referring to FIG. 9, prior to humidity exposure the uncoated sample, appeared to react immediately with paraoxon and continued to react over the 20 hour analysis time. On the other hand, after humidity exposure the uncoated sample shows only the signal due to free paraoxon confirming that it has lost reactivity. Remarkably, the mineral oil (50 weight %) coated samples reacted essentially similar to the uncoated dry magnesium oxide nanoparticles (FIG. 10). This is true of the mineral oil coated samples both prior to and after humidity exposure. This clearly indicates that the mineral oil coating offers superior protection from humidity effects without reducing the reactivity of the nanoparticles.

Figure 11:
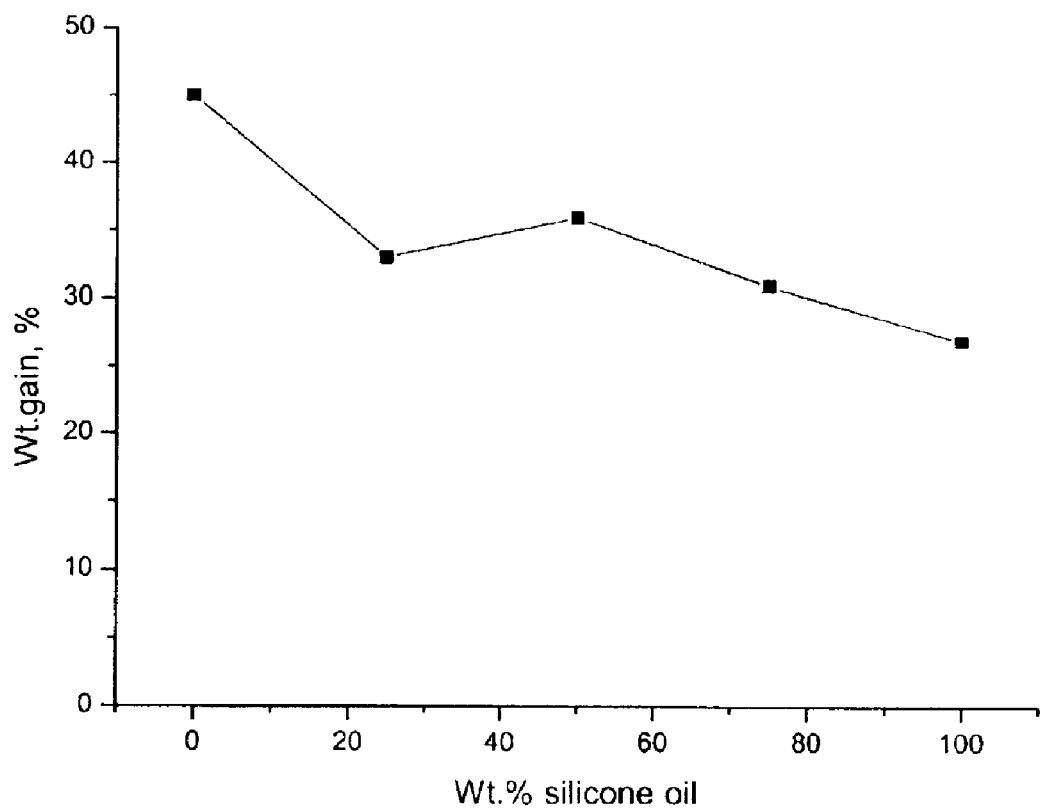
FIG. 11 is a graph showing the weight gain, after humidity exposure, by magnesium oxide nanoparticles coated with silicone oil.
Figure 12:
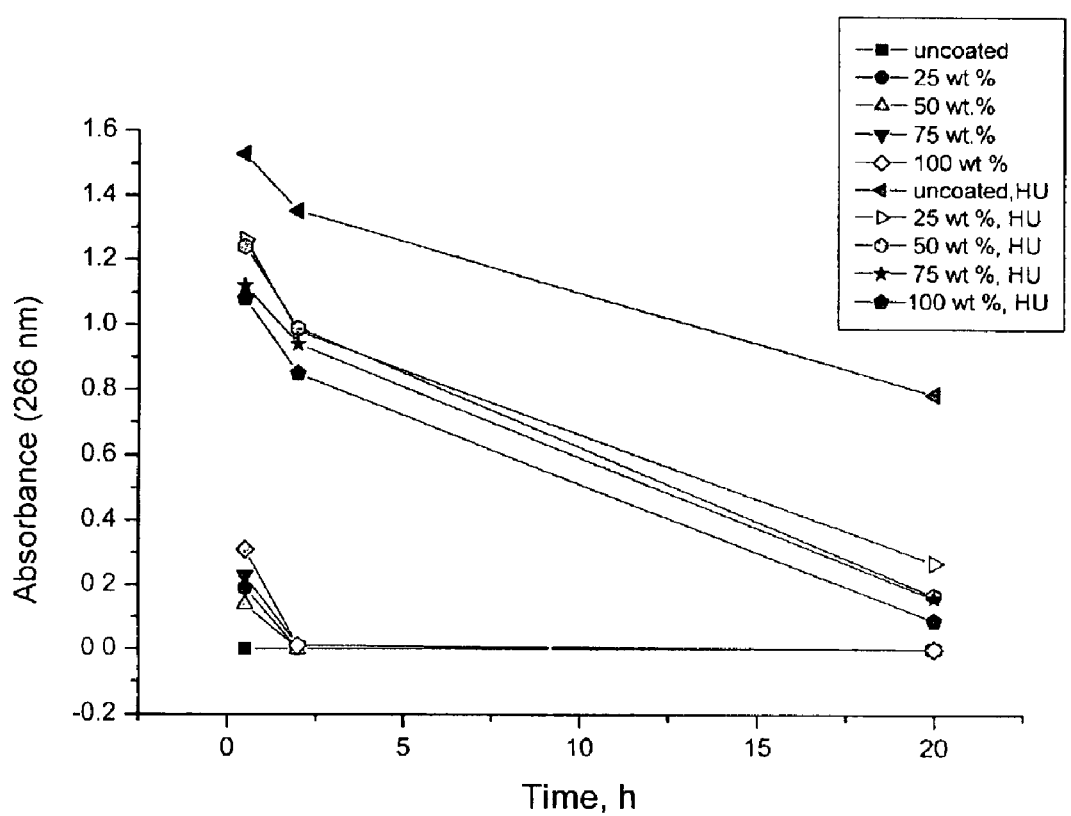
FIG. 12 depicts the rate of adsorption of paraoxon by magnesium oxide nanoparticles and silicone oil-coated magnesium oxide nanoparticles before and after humidity exposure.
Figure 13:
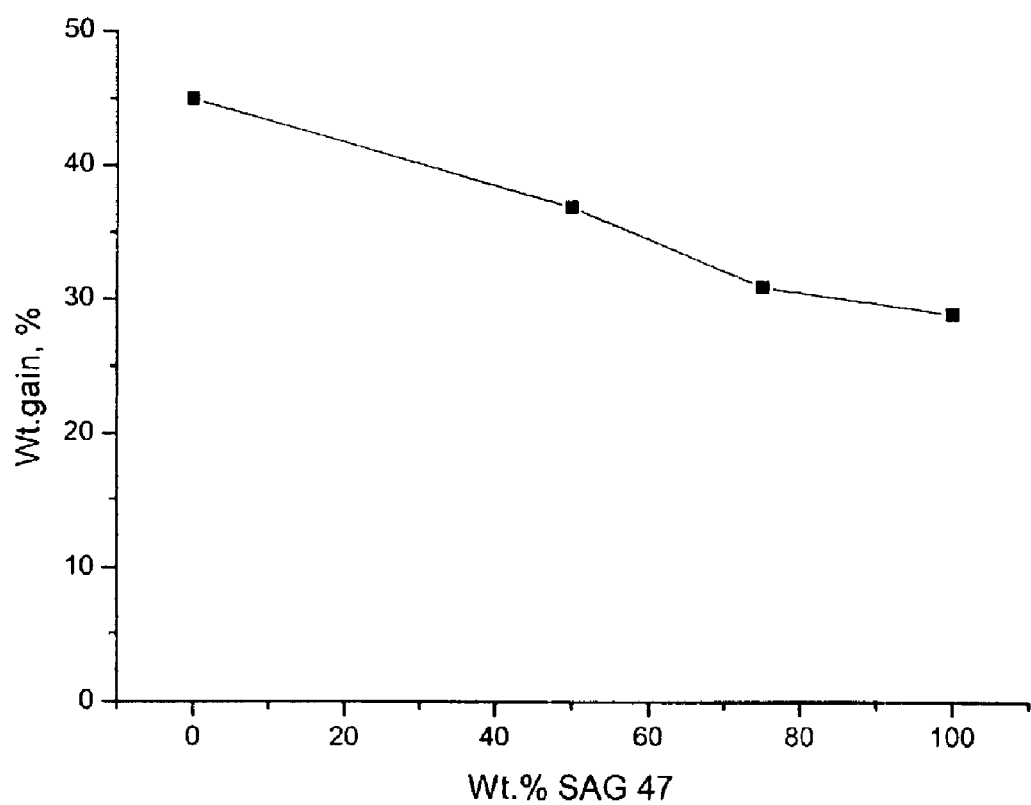
FIG. 13 is a graph showing the weight gain, after humidity exposure, by magnesium oxide nanoparticles coated with a modified silicone oil derivative (SAG 47)
Figure 14:
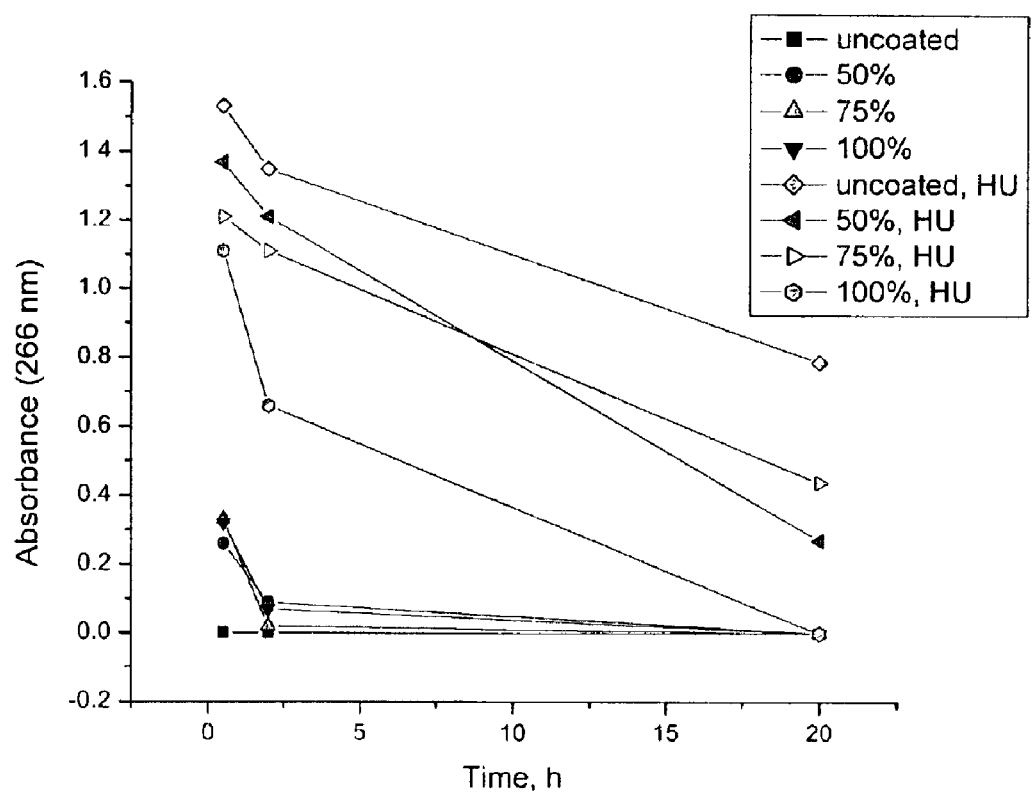
FIG. 14 depicts the rate of adsorption, both before and after humidity exposure, of paraoxon by magnesium oxide nanoparticles and magnesium oxide nanoparticles coated with a modified silicone oil derivative (SAG 47)
Figure 15:
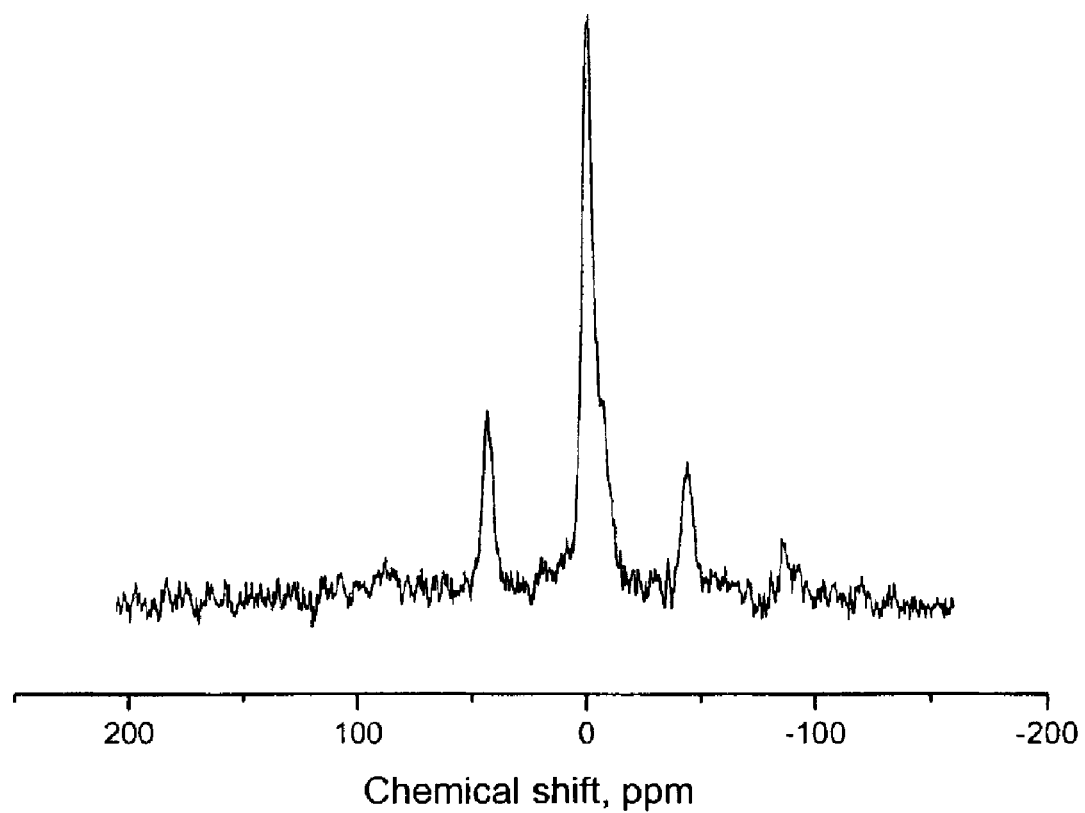
FIG. 15 is a graph depicting a $^{31}$P NMR spectrum after humidity exposure of a mixture of magnesium oxide nanoparticles coated with a modified silicone oil derivative (SAG 47) and of paraoxon after 20 hours.

Magnesium oxide nanoparticles coated with silicone oil and magnesium oxide particles coated with a modified silicone oil derivative (SAG 47, obtained from Crompton Corporation) were prepared following the procedure described in Part 1 of this example. FIGS. 11 and 12 set forth the data on the nanoparticles coated with silicone oil, while FIGS. 13 and 14 show the results for the nanoparticles coated with the modified silicone oil derivative. These results further confirm that long chain hydrocarbons (e.g., $C_{18}$–$C_{24}$) and polydimethyl siloxanes

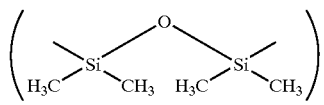

provide a barrier between the nanoparticle surface and its surroundings.

Example 4

Magnesium Oxide Nanoparticles Coated with Wax

In this procedure, magnesium oxide nanoparticles were coated with one of three different waxes: paraffin wax; carnauba wax; and a polyethylene-based wax derived via polymerization of ethylene. The particles were coated by mixing 2 g of magnesium oxide nanoparticles with the particular wax (10%, 25%, or 50% by weight, based upon the nanoparticles taken as 100% by weight) in a beaker with a spatula followed by placing the mixture in a hot oil bath (100–110° C. for the lower melting waxes and 145–150° C. for the higher melting waxes) for 5–7 minutes with stirring. These samples were then tested for their air stability and paraoxon reactivity, with these results being depicted in FIGS. 16–21.

Figure 16:
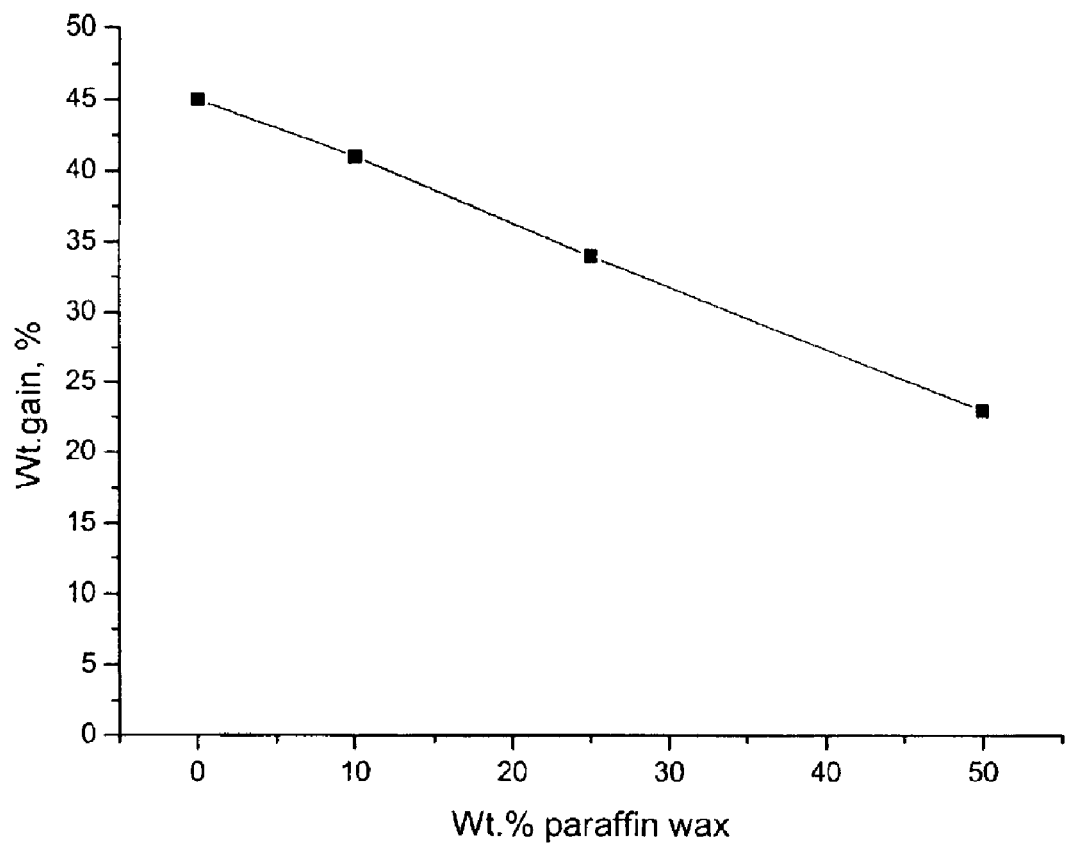
FIG. 16 is a graph showing the weight gain, after humidity exposure, by magnesium oxide nanoparticles coated with paraffin wax.
Figure 17:
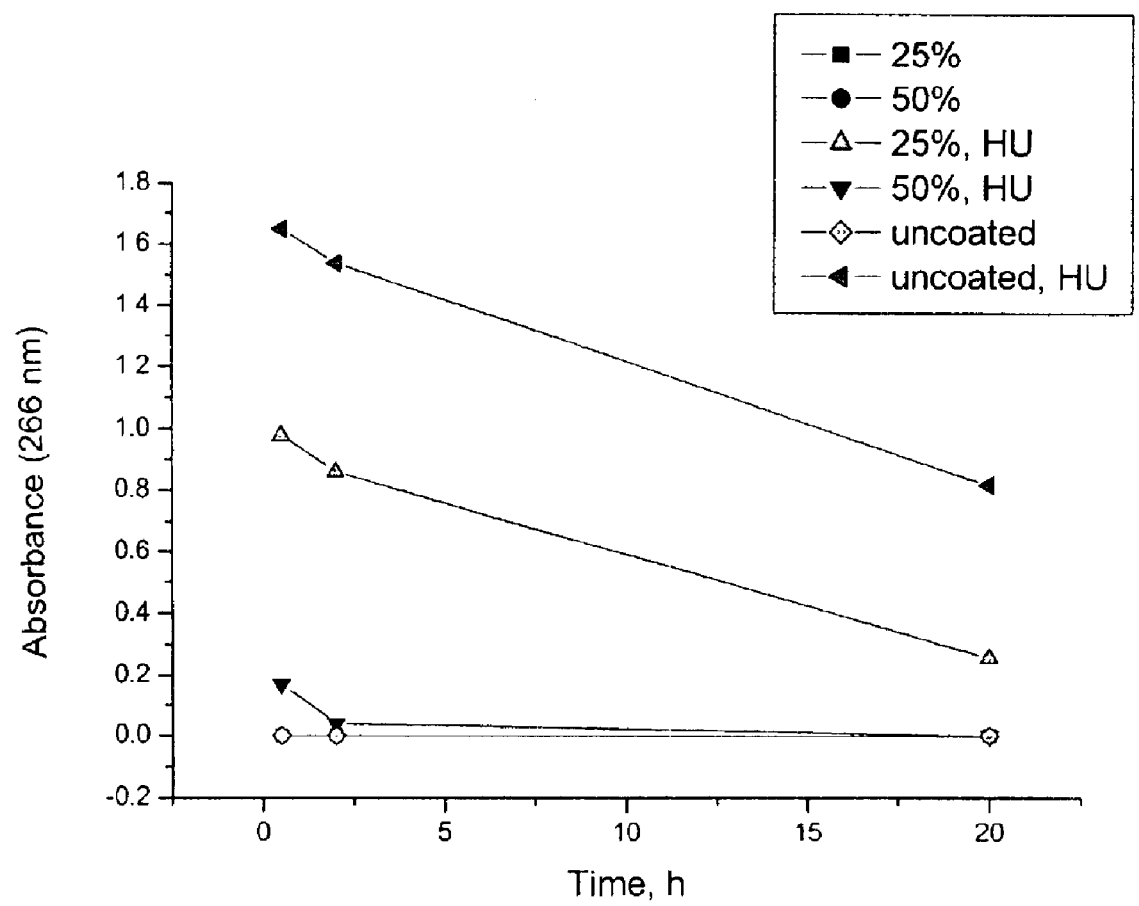
FIG. 17 depicts the rate of paraoxon adsorption, both before and after humidity exposure, by magnesium oxide nanoparticles and magnesium oxide nanoparticles coated with paraffin wax.

FIGS. 16 and 17 illustrate that paraffin wax provides a barrier of protection for the magnesium oxide particles. Furthermore, it can be seen that the 50 weight % coated samples were able to adsorb paraoxon completely, both before and after humidity exposure.

Figure 18:
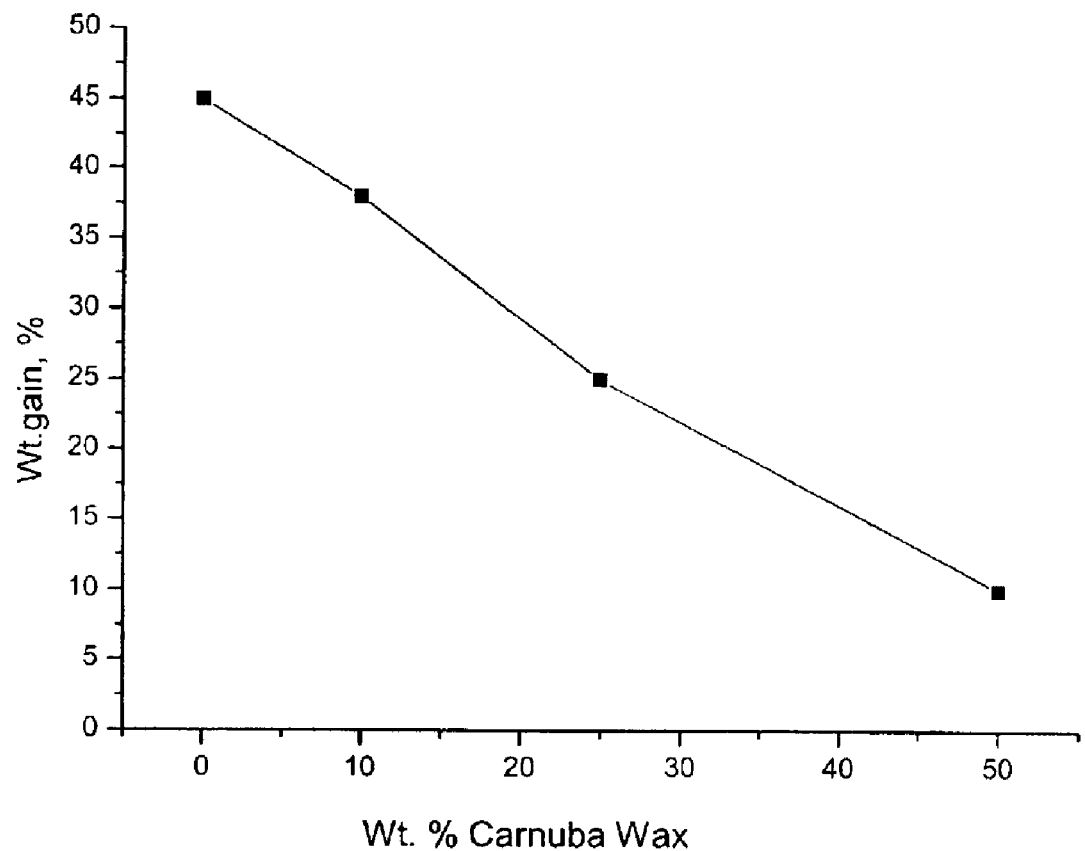
FIG. 18 is a graph demonstrating the weight gain, after humidity exposure, by magnesium oxide nanoparticles coated with carnauba wax.
Figure 19:
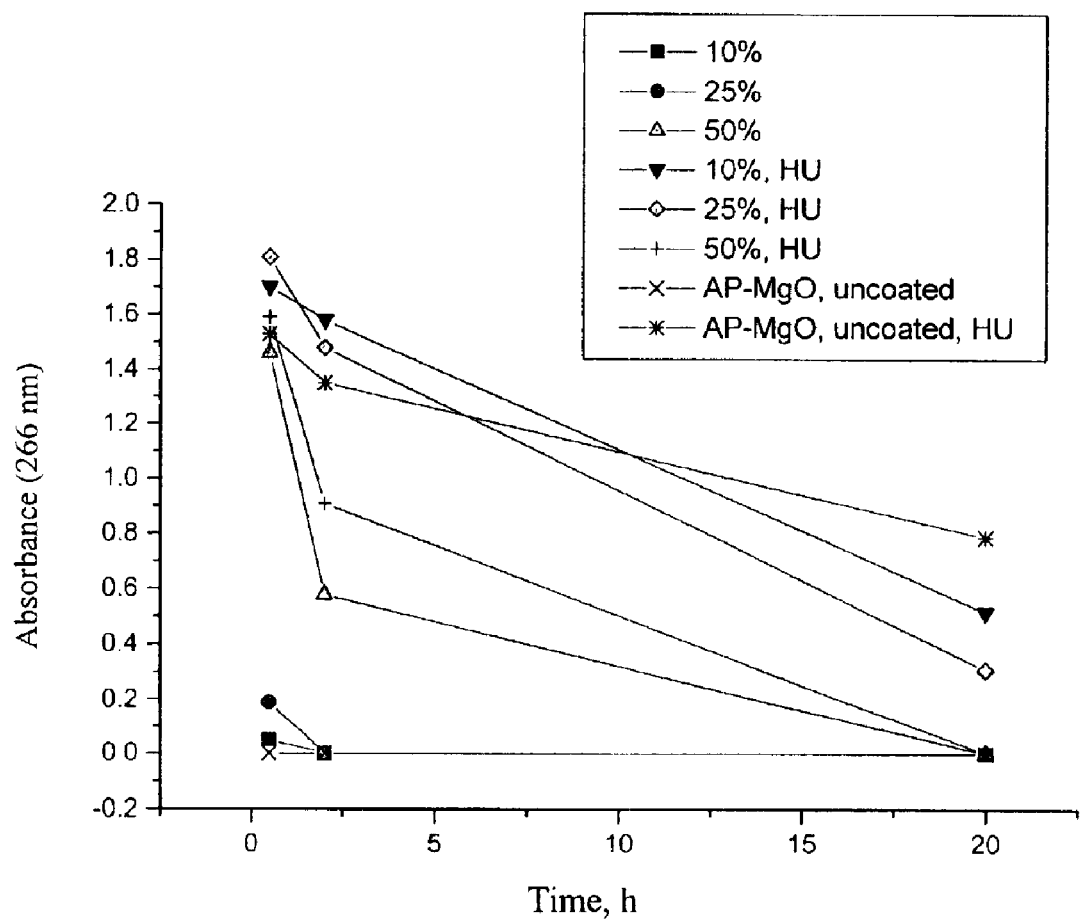
FIG. 19 depicts the rate of paraoxon adsorption, both before and after humidity exposure, by magnesium oxide nanoparticles and magnesium oxide nanoparticles coated with carnauba wax.

With respect to the carnauba wax, FIGS. 18 and 19 illustrate that increasing the amount of wax correspondingly increased protection against air exposure and resulted in lower weight gain upon humidifying. Furthermore, both samples coated with 50 weight % carnauba wax reacted comparably and completely with paraoxon both before and after humidity exposure.

Figure 20:
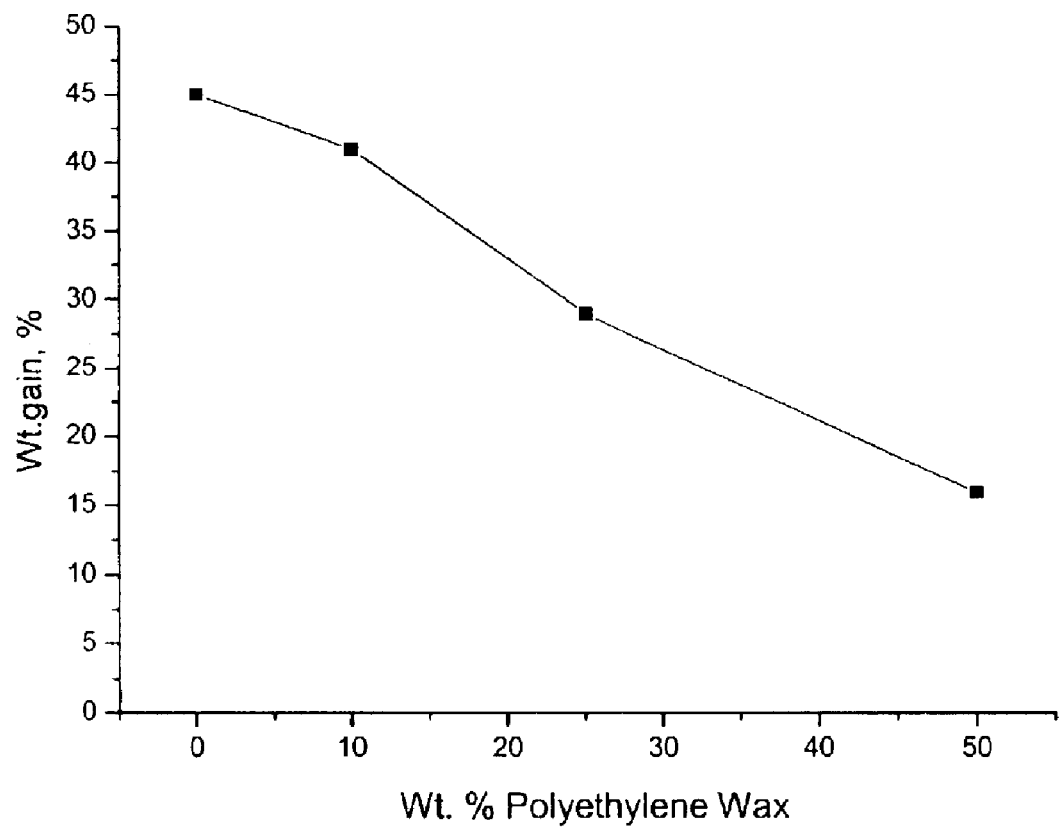
FIG. 20 shows the weight gain, after humidity exposure, by magnesium oxide nanoparticles coated with polyethylene wax.
Figure 21:
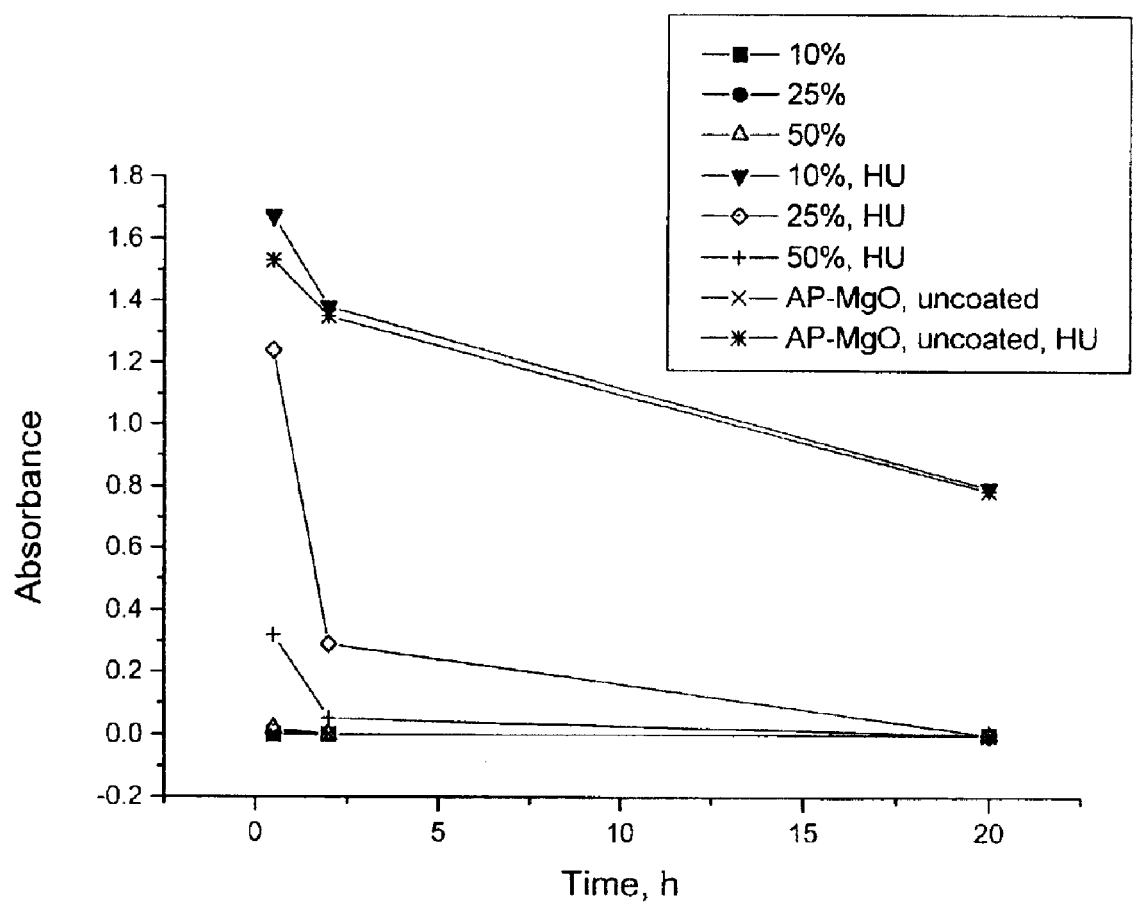
FIG. 21 demonstrates the rate of paraoxon adsorption, both before and after humidity exposure, by magnesium oxide nanoparticles and magnesium oxide nanoparticles coated with polyethylene wax.

FIGS. 20 and 21 show that the polyethylene wax also provided a barrier of protection from humidity for the magnesium oxide nanoparticles. Both the 25 and 50 weight % coated samples were able to absorb paraoxon completely, before as well as after humidity exposure. Thus, this concluded that a wide variety of waxes would be suitable coating materials for magnesium oxide nanoparticles.

Example 5

1. Magnesium Oxide Nanoparticles Modified by Silyl Reagents

Figure 22:
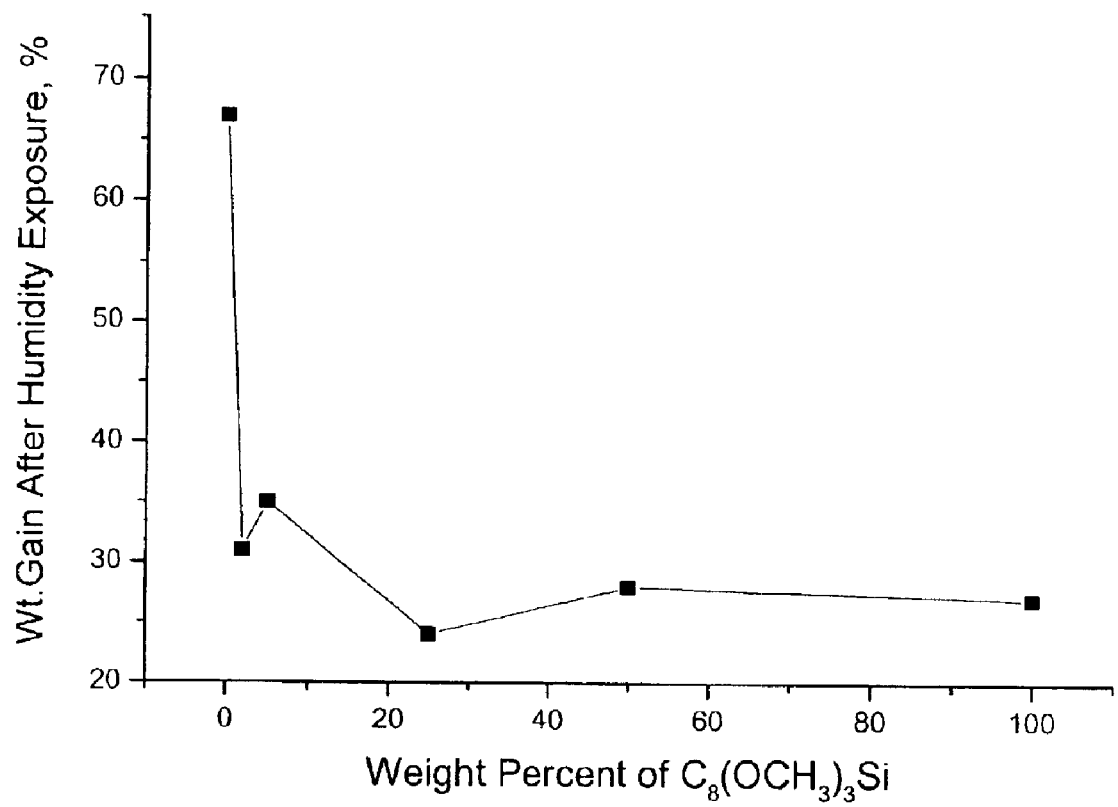
FIG. 22 is a graph showing the weight gain, after humidity exposure, by magnesium oxide nanoparticles coated or modified with a $C_8$ silyl.
Figure 23:
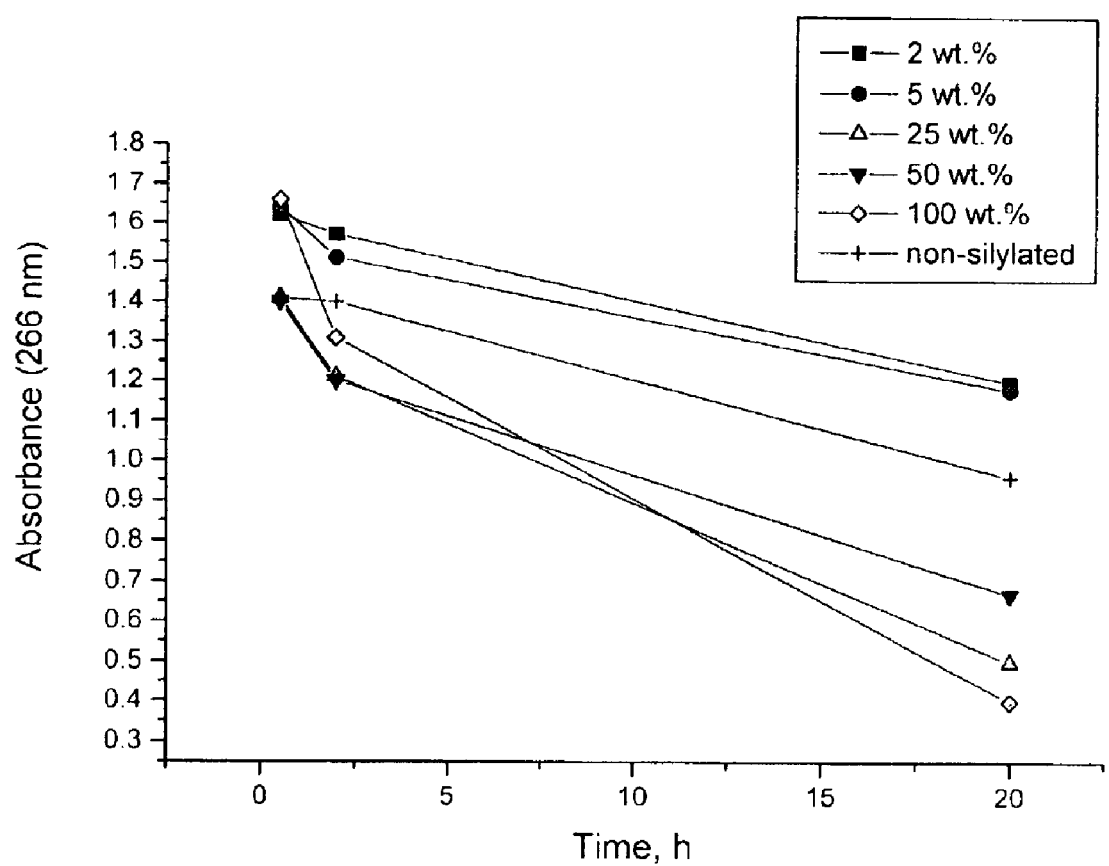
FIG. 23 depicts the rate of paraoxon adsorption after humidity exposure by magnesium oxide nanoparticles and magnesium oxide nanoparticles coated or modified with a $C_8$ silyl.

Magnesium oxide nanoparticle surfaces were chemically modified with a silane coupling reagent. This was accomplished by placing 100 mL of 95% aqueous ethanol solution, 6 drops of acetic acid, and the desired amount of n-octyl trimethoxysilane in a stoppered Erlenmeyer flask. The amounts of n-octyl trimethoxysilane were varied from 2–100% by weight, based upon the weight of magnesium oxide nanoparticles used. After stirring this reaction mixture for 5 minutes in order to allow hydrolysis and silanol formation, 2 g of magnesium oxide nanoparticles were added followed by more stirring for 15 minutes. The mixture was then centrifuged, washed with ethanol (2 times with 25 mL portions), and dried at 110° C. for 30 minutes. These samples were then tested for air stability and paraoxon reactivity. These results are shown in FIGS. 22–23.

These results show that the silylated samples had paraoxon reactivity similar to that of the original magnesium oxide nanoparticles before humidity exposure (data not shown). Thus, it was concluded that surface silylation did not alter the magnesium oxide reactivity. Furthermore, there was an appreciable reduction in weight gain when silylated magnesium oxide nanoparticles were exposed to humidifying conditions as compared to the untreated samples (see FIG. 22). Thus, it appears that the $C_8$ organic group did provide a hydrophobic coverage of the surface of the nanoparticles. It was noted that the weight gain after humidity exposure was not appreciably affected by the amount of the silyl agent used. Referring to FIGS. 22 and 23, the lowest weight gain and good paraoxon adsorption were seen with the 25 weight % silylated sample. Further testing showed that similar results were achieved when changing the length of the alkyl group or the number of alkyl groups on the silicon.

Figure 24:
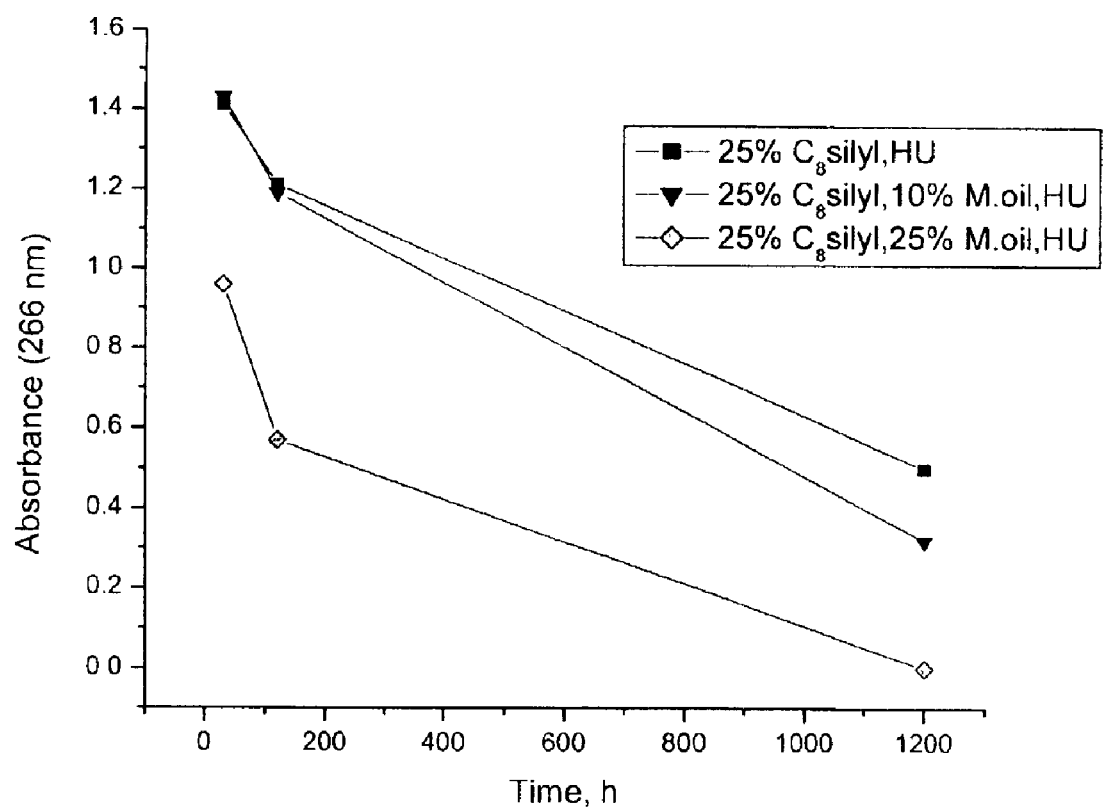
FIG. 24 depicts the rate of paraoxon adsorption after humidity exposure by magnesium oxide nanoparticles coated or modified with a $C_8$ silyl and then coated with mineral oil.

2. Magnesium Oxide Nanoparticles Modified by Silyl Reagents and Coated with Mineral Oil Magnesium oxide nanoparticles were modified by n-octyl trimethoxysilane using a dry procedure wherein 3 g of the magnesium oxide nanoparticles where mixed with 0.75 g of n-octyl trimethoxysilane in a plastic cylindrical container. Mixing was carried out with a Dispermat mixer (approximately 600 rpm for 1 minute), followed by mixing with a spatula, and further mixing with the Dispermat mixer (approximately 800 rpm for 1 minute). The resultant sample was cured at 100° C. for half an hour. Samples of the modified nanoparticles were then coated with 10% by weight and 25% by weight, respectively, of mineral oil. As shown in FIG. 24, the use of both the silyl reagent and mineral oil resulted in an appreciable improvement in the rate of paraoxon adsorption of these samples after humidity exposure.

Example 6

Magnesium Oxide Nanoparticles Embedded in Silicone Rubber/Elastomer Membranes

This procedure was carried out to establish the feasibility of preparing nanoparticles containing silicone membranes, and to explore the capability of this embodiment to adsorb paraoxon. In this procedure, 0.4 g of magnesium oxide nanoparticles were mixed with approximately 3 g of a commercially available, room temperature-curing silicone (GE silicone II 100% silicone sealant, clear). The resulting mixture was cast quickly onto 3–4 microscope slides (25× 75×1 mm). Curing was carried out by exposing the slides to air under ambient conditions (45–54% RH, 18–21° C., 24 hours). The resultant membranes were peelable, flexible, soft and appeared to contain a homogenous dispersion of the nanoparticles. Membranes containing both mineral oil coated nanoparticles and uncoated nanoparticles were prepared by this procedure. The membranes containing mineral oil coated nanoparticles were thinner and more transparent than the ones containing uncoated nanoparticles.

Table 5 summarizes the results of paraoxon (4.5 µL) adsorption with various membrane samples in 100 mL of pentane solvent. As seen in the control experiment (Entry 1), the silicone membrane by itself does not adsorb paraoxon while membranes containing nanoparticles adsorb paraoxon gradually over a period of 28 hours. Humidity exposure appeared to slow down the paraoxon adsorption as shown by comparing Entry 4 to Entries 2 and 3, and Entry 7 to Entries 5 and 6, respectively. In contrast, mineral oil coated samples appear to adsorb paraoxon more rapidly and completely both before and after humidity exposure.

TABLE 5

| Entry | Wt. of membrane, g | Wt. of AP-MgO, g | Paraoxon adsorbed[e], % | | | |
|---|---|---|---|---|---|---|
| | | | ½ h | 2 h | 20 h | 28 h |
| 1[a] | 0.3929 | 0 | 0 | 0 | 0 | 0 |
| 2[b] | 0.4037 | 0.09 | 36 | 48 | 75 | 79 (88) |
| 3 | 0.3144 | 0.07 | 22 | 33 | 57 | 60 (86) |
| 4 | 0.5352 | 0.12 | 13 | 24 | 49 | 54 (45) |
| 5[c] | 0.6424 | 0.09 | 28 | 45 | 81 | 87 (97) |
| 6 | 0.7049 | 0.09 | 31 | 53 | 88 | 92 (102) |
| 7 | 0.5076 | 0.07 | 10 | 19 | 43 | 47 (67) |
| 8[d] | 0.7777 | 0.09 | 42 | 68 | 94 | 97 (108) |
| 9 | 0.5998 | 0.07 | 37 | 58 | 90 | 97 (139) |
| 10 | 0.4856 | 0.06 | 24 | 36 | 60 | 64 (107) |

[a]Entry 1 contains no AP-MgO.
[b]Entries 2–4 were made with silicone (2.81 g) and AP-MgO (0.4 g).
[c]Entries 5–7 were made with silicone (3.05 g) and AP-MgO (0.4 g).
[d]Entries 8–10 were made with silicone (3.02 g) and 50 wt. % mineral oil coated AP-MgO (0.6 g).
[e]Numbers in parentheses are normalized for 0.1 g AP-MgO.

We claim:

1. A composition comprising particles of a metal oxide or a metal hydroxide having an average crystallite size of up to about 20 nm and which are at least partially coated with a coating material selected from the group consisting of N,N-dimethyl dodecyl amine, dioctyl sodium sulfosuccinate, 2,4,7,9-tetramethyl-5-decyne-4,7-diol, nonylphenol polyethylene glycol ethers, $C_{10-14}$ alkyl ether phosphates, ethoxylated alcohols, alkyl amines, amine salts, ethoxylated amines, mineral oils, silicone oils, fomblin oils, vegetable oils, carnauba wax, polyethylene wax, silyl reagents, proteins, DNA, KNA, enzymes, carbohydrates, starches, butadiene, styrene, copolymers of butadiene and styrene copolymers of styrene, acrylonitrile, polyvinylchloride, polybutadiene-coacrylonitrile, acrylonitrile-butadiene-styrene, cellulosics, silicon rubbers, nylons, rubbers, polyurethane, rayon, polyvinylidene chloride, polycarbonates, aramids, polyvinylpyrrolidone, polyesters, and mixtures thereof.

2. The composition of claim 1, said metal oxide or metal hydroxide having a multi-point surface area of at least about 15 $m^2/g$.

3. The composition of claim 1, said particles being selected from the group consisting of oxides and hydroxides of Mg, Sr, Ba, Ca, Ti, Zr, Fe, V, Mn, Fe, Ni, Cu, Al, Si, Zn, Ag, and unalloyed mixtures thereof.

4. A composition comprising particles of a mono-metal oxide or a mono-metal hydroxide having an average crystallite size of up to about 20 nm and which are at least partially coated with a coating material selected from the group consisting of mineral oils, fomblin oils, and silicone oils.

5. A composition comprising particles of a mono-metal oxide or a mono-metal hydroxide having an average crystallite size of up to about 20 nm and which are at least partially coated with a coating material selected from the group consisting of paraffin wax, carnauba wax, polyethylene wax, and mixtures thereof.

6. A composition comprising particles of a mono-metal oxide or a mono-metal hydroxide having a multi-point surface area of at least about 15 $m^2/g$ and an average crystallite size of up to about 20 nm and which are at least partially coated with a coating material selected from the group consisting of mineral oils, fomblin oils, and silicone oils.

7. A composition comprising particles of a mono-metal oxide having the surfaces thereof modified with silyl groups and having an average crystallite size of up to about 20 nm and which are at least partially coated with a coating material selected from the group consisting of surfactants, oils, waxes, polymers, resins, and mixtures thereof.

8. A composition comprising particles of a mono-metal oxide having the surfaces thereof modified with silyl groups and having a multi-point surface area of at least about 15 $m^2/g$ and an average crystallite size of up to about 20 nm and which are at least partially coated with a coating material selected from the group consisting of surfactants, oils, waxes, polymers, resins, and mixtures thereof.

* * * * *